United States Patent [19]

Kim

[11] Patent Number: 5,781,521
[45] Date of Patent: Jul. 14, 1998

[54] OPTICAL DISK RECORDING/ REPRODUCING APPARATUS

[75] Inventor: Dae Young Kim, Seoul, Rep. of Korea

[73] Assignee: LG Electronics, Inc., Seoul, Rep. of Korea

[21] Appl. No.: 752,594

[22] Filed: Nov. 19, 1996

[30] Foreign Application Priority Data

Jan. 5, 1996 [KR] Rep. of Korea .................... 84/1996

[51] Int. Cl.$^6$ .................................................. G11B 7/00
[52] U.S. Cl. ........................ 369/59; 369/48; 369/124; 369/44.34
[58] Field of Search ..................... 369/60, 59, 48, 369/47, 49, 50, 54, 58, 32, 124, 44.34, 44.35

[56] References Cited

U.S. PATENT DOCUMENTS 5,563,864 10/1996 Kobayashi et al. ............... 369/48 X
5,602,816 2/1997 Amada et al. ..................... 369/59

*Primary Examiner*—Muhammad N. Edun
*Attorney, Agent, or Firm*—Morgan, Lewis & Bockius LLP

[57] ABSTRACT

An optical disk recording/reproducing apparatus includes an optical pickup for recording information onto a disk and reproducing information from the disk; a playback signal processing unit for receiving electrical signals from the optical pickup and for outputting a focus control signal, a tracking control signal, and a high-frequency playback signal; an asymmetric equalizer for equalizing the high-frequency playback signal from the playback signal processing unit to compensate for the asymmetric playback characteristic of the optical pickup; and a channel bit signal playback unit for zero-crossing the equalized high-frequency playback signal from the asymmetric equalizer and for outputting it as a channel bit signal string of square wave.

25 Claims, 17 Drawing Sheets

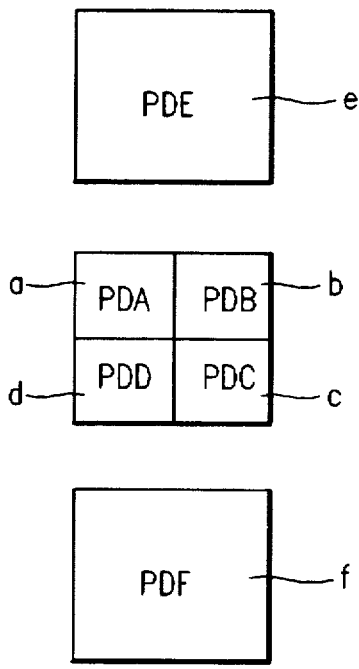

(a) mirror surface  (b) signal pit  (c) mirror surface  (d) signal pit state of "1"

state of "0"

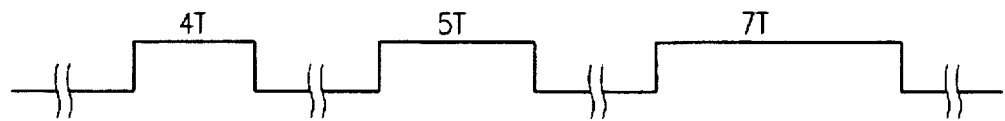
FIG.16A
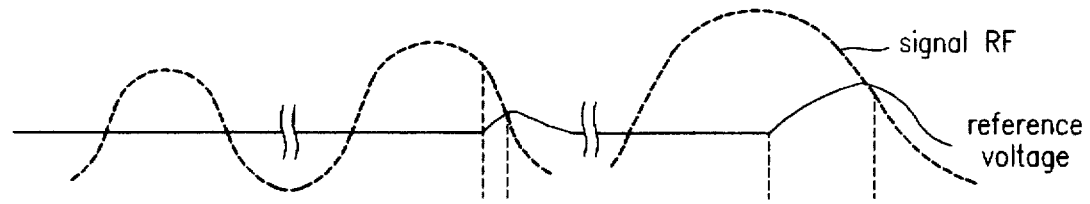
FIG.16B
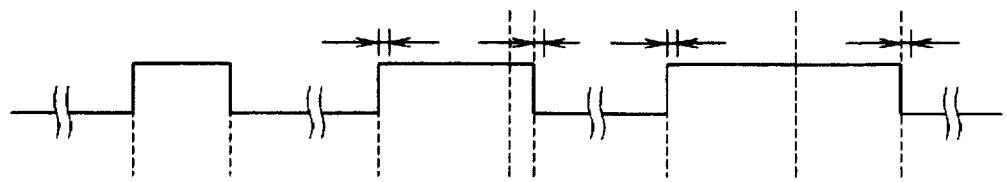
FIG.16C
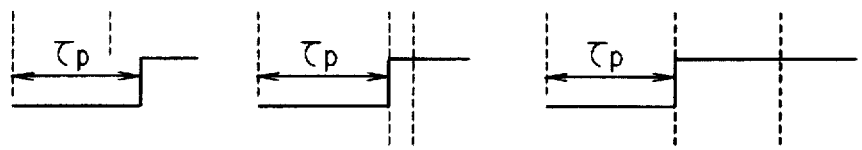
FIG.16D
FIG.16E
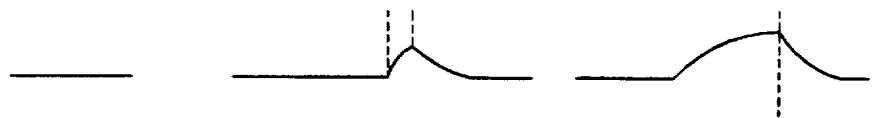

OPTICAL DISK RECORDING/ REPRODUCING APPARATUS

BACKGROUND OF THE INVENTION

1. Field of the Invention

The present invention relates to an optical disk recording/ reproducing apparatus, and more particularly, to an optical disk recording/reproducing apparatus for recording or reproducing a playback-only optical disk, such as a compact disk (CD), or a recordable optical disk.

2. Discussion of the Related Art

Generally speaking, in order to record information or reproduce the information recorded, an optical disk recording/reproducing apparatus projects a laser beam to converge on the signal tracks of an optical disk at a predetermined velocity. For this purpose, the focusing and tracking of an optical pickup device of the apparatus and the rotation velocity of the optical disk must be controlled.

In a playback-only magnetooptical disk such as a CD, information signals are recorded as serial pits on spiral signal tracks. In order to reproduce the information recorded, tracking of the laser beam focused by the optical pickup device is controlled along the signal pit tracks. First, a sync signal of a channel bit signal stream reproduced by reading out information recorded on the maonetooptical disk is detected. Next, it is compared with a reference sync signal of a predetermined period regarding its frequency and phase in order to detect a control signal in accordance with the rotation velocity of the disk and thus control it at a predetermined value. By doing so, the pit signals are reproduced at a predetermined velocity.

FIG. 1 is a block diagram of a general optical disk reproducing apparatus. This apparatus includes a turntable 10 driven by a spindle motor 8 for controlling the rotation speed of a disk 1. The turntable 10 is on the driving axis of the spindle motor 8. An optical pickup 2 projects a laser beam onto the disk 1 located on the turntable 10 and detects the light reflected therefrom. A playback signal processing portion 3 receives electrical signals (see a, b, c, d, e, and f of FIG. 2C) output from the optical pickup 2 and then outputs a focus control signal Fe, a tracking control signal Te, and a high-frequency playback signal RF. An equalizer 4 equalizes the high-frequency playback signal RF (which is distorted) to output an undistorted equalized high-frequency playback signal RFe. A channel bit signal reproducing portion 5 includes a zero-crossing circuit 5A for zero-crossing the equalized high-frequency playback signal RFe and outputting it as a square wave. The channel bit signal reproducing portion 5 outputs a channel bit signal stream CHBr. A tracking controller 6 performs tracking control for the optical pickup 2 by using the tracking control signal Te from the playback signal processing portion 3. A focus controller 7 performs focusing control for the optical pickup 2 by using the focus control signal Fe output from the playback signal processing portion 3. A light stabilizer 9 stabilizes the generation of the laser beam of the optical pickup 2. Here, the channel bit signal stream CHBr output from the channel bit signal reproducing portion 5 is output as digital data after decoding and error correction.

The optical pickup 2 includes a laser diode LD for generating the laser beam, and a grating GR and a beam splitter BS for forming an auxiliary beam for detecting the tracking signal in a three-beam mode. Using the laser beam generated from the laser diode LD, an objective lens OL converges the three beams projected from the beam splitter BS on the signal tracks of the disk 1. A tracking driver TA and a focus driver FA control the tracking and focusing so that the three beams converge on the signal tracks of the optical disk 1 by using the objective lens OL. A sensor lens SL obtains the focus control signal by astigmatism, and a photodetector PD detects the beams reflected by the disk and then outputs them to the playback signal processing portion 3.

In the configuration of FIG. 1, when the laser beam is produced by the laser diode LD under the control of the light stabilizer 9, the auxiliary beam for detecting the tracking signal in the three-beam mode is formed through the grating GR and beam splitter BS. The three beams including the main beam and auxiliary beams projected through the beam splitter BS converge on the signal tracks of the disk 1 through the objective lens OL, and then are reflected to be detected by the sensor lens SL and the photodetector PD. As shown in FIG. 2A, the main light beam LB for reading information signals and auxiliary light beams LBr and LBl for detecting the tracking control signal are projected along the signal tracks made up with pits on the optical disk 1, as shown in FIG. 2B. The beams reflected by the signal recording surface of the optical disk 1 (where the information signals are recorded) converge on the objective lens OL and then are received by the sensor lens SL via the beam splitter BS. The beams converged are then detected by the photodetector PD shown in FIG. 2C to read the electrical signals a, b, c, d, e and f. Here, as depicted in FIG. 2B, given that the track pitch (i.e., the interval between signal tracks) is Tp, the auxiliary beams for detecting the tracking control signal are each disposed to be spaced from the tracks by 0.25 Tp.

As shown in FIG. 2C, the photodetector PD includes a main photodetecting device for detecting the light amount of the main beam, and auxiliary photodetecting devices for detecting the light amount of the auxiliary beams. The main photodetecting device is made of a predetermined number, for instance, four, of photodetecting, devices PDA, PDB, PDC, and PDD divided in the track and radial directions of the optical disk 1. The auxiliary photodetecting devices for detecting the light amount of the auxiliary beams include two photodetecting devices PDE and PDF positioned respectively at the upper and lower portions of the main photodetecting device.

The photodetecting devices PDA, PDB, PDC, PDD, PDE and PDF of the photodetector PD respectively output electrical signals a, b, c, d, e, and f to the playback signal processing portion 3, which in turn produces the focus control signal Fe, tracking control signal Te, and high-frequency playback signal RF.

More specifically, the playback signal processing portion 3 receives the electrical signals a, b, c, and d detected by the photodetecting devices PDA, PDB, PDC, and PDD, and performs an [(a+c)-(b+d)] operation in order to obtain the focus control signal Fe. The high-frequency playback signal RF is obtained by performing an (a+b+c+d) operation on the electrical signals a, b, c, and d. The electrical signals e and f detected by the photodetecting devices PDE and PDF undergoes an (e-f) operation to produce the tracking control signal Te. Here, the tracking control signal Te from the playback signal processing portion 3 is input to the tracking controller 6 for the purpose of signal processing, and then input to the optical pickup 2 in order to drive the tracking driver TA for the purpose of tracking control. The focus control signal Fe is input to the focus controller 7 for signal processing, and then input to the optical pickup 2 in order to drive the focus driver FA for focus control. This process puts the converged light beams on the center of the tracks of the disk 1.

Meanwhile, the high-frequency playback signal RF from the playback signal processing portion 3 is distorted due to the signal playback characteristic of the disk when the signal pits of the disk are read by the optical pickup 2. The RF signal is converted into a high-frequency playback signal R-Fe suitable for processing by emphasizing its high frequency characteristic in the equalizer 4. The converted signal is output to the zero-crossing circuit 5A. The zero-crossing circuit 5A zero-crosses the high-frequency playback signal RFe from the equalizer 4 and thus forms it into a square wave. The channel bit signal reproducing portion 5 detects the channel bit signal stream CHBr from which the sync signal and clock signal of the channel bit are detected: Here, the channel bit signal stream CHBr detected is decoded and error-corrected by a digital signal processor, and then sent out as the digital information data. This data is processed in various ways in accordance with its usage.

The laser diode LD is controlled by the light stabilizer 9, and, during playback, maintains a predetermined intensity of light suitable for playback. For the equalizer 4, a three-tap equalizer shown in FIG. 3A is used in a general magnetooptical disk reproducing apparatus. In an apparatus for recording/reproducing a high-density magnetooptical disk such as a digital versatile disk, a five-tap equalizer shown in FIG. 3B is used.

Referring to FIG. 3A the three-tap equalizer includes delays 11 and 13 for sequentially delaying the high-frequency playback signal RF from the playback signal processing portion 3, an amplifier 12 for amplifying the high-frequency playback signal RF to a predetermined gain $\alpha 1$, another amplifier 14 for amplifying the output of the delay 13 to a predetermined gain $\alpha 1$, and a summer 15 for summing the outputs of the amplifiers 12 and 14 and the output of the delay 11.

In the three-tap equalizer constructed as in FIG. 3A, when the high-frequency playback signal RF is received from the playback signal processing portion 3, it is sequentially delayed in the delays 11 and 13 and amplified to gain $\alpha 1$ in the amplifier 12. The output of the delay 13 is amplified to gain $\alpha 1$ in the amplifier 14 and added to the outputs of the amplifier 12 and the delay 11 in the summer 15. Here, the characteristic of the equalizer varies with the gain $\alpha 1$ of the amplifiers 12 and 14. The delay times of the delays 11 and 13 are the same, i.e., $\tau 1$. The gains of the amplifiers 12 and 14 are also the same, i.e., $\alpha 1$. For this reason, the three-tap equalizer is symmetric.

Turning to FIG. 3B, the five-tap equalizer includes delays 17, 19, 20 and 22 for sequentially delaying the high-frequency playback signal RF from the playback signal processing portion 3, amplifiers 16, 18, 21 and 23 for amplifying the high-frequency playback signal RF from the playback signal processing portion 3 and the output of the delays 17, 20 and 22 to respective predetermined gains $\alpha 11$ and $\alpha 12$, and a summer 24 for summing the outputs of the amplifiers 16, 18, 21 and 23 and the output of the delay 19.

In the five-tap equalizer constructed as in FIG. 3B, when the high-frequency playback signal RF is received from the playback signal processing portion 3, it is sequentially delayed in the delays 17, 19, 20 and 22, and amplified to gain $\alpha 12$ in the amplifier 16. The output of the delay 17 is sent to both the delay 19 and the amplifier 18, and the output of the delay 19 is sent to both the delay 20 and the summer 24. The output of the delay 20 is sent to both the delay 22 and the amplifier 21, and the output of delay 22 is sent to the amplifier 23.

The amplifier 18 amplifies the output of the delay 17 to gain $\alpha 11$, the amplifier 21 amplifies the output of the delay 20 to gain $\alpha 11$, and the amplifier 23 amplifies the output of the delay 22 to gain $\alpha 12$. The summer 24 sums the outputs of the delay 19 and the amplifiers 16, 18, 21 and 23. The summation result is output to the channel bit signal reproducing portion 5. The characteristic of the equalizer varies with gains $\alpha 11$ and $\alpha 12$ of the amplifiers 16, 18, 21 and 23.

The delay times of the delays 19 and 20 preceding and succeeding the playback signal are the same (i.e., $\tau 1$). The delay times of the delays 17 and 22 are the same (i.e., $\tau 2$). The gains of the amplifiers 18 and 21 are the same (i.e., $\alpha 11$), and the gains of the amplifiers 16 and 23 are the same (i.e., $\alpha 11$). Therefore, the five-tap equalizer is symmetric like the three-tap equalizer.

These equalizers shown in FIGS. 3A and 31B have a high-frequency emphasis characteristic which increases the high-frequency signal because they are symmetric. Here, the wavelength of the playback light beam converged by the optical pickup 2 cannot be below the wavelength of the laser beam. In case of reproducing a signal with a finite aperture, the optical pickup 2 acts as a low-pass filter according to its playback characteristic so that the highfrequency signal is increased in the equalizer 4 (FIG. 3A or 3B). Therefore, the playback performance becomes uniform throughout the frequency domain of the signal. This is because that the effects by the preceding and succeeding signals are equal in case of reproducing a signal recorded by the symmetric aperture.

In addition, with respect to a small high-frequency signal, the effect of external noise or crosstalk of mixed signals of nearby signal tracks are severe. The equalizer 4 of FIG. 3A or 3B increases the high-frequency signal, thereby improving its playback performance.

In order to improve jitter characteristic, the channel bit signal stream CHBr is detected by the channel bit signal reproducing portion 5. More specifically, the equalized high-frequency playback signal RFe from the equalizer 4 is output to the zero crossing, circuits 5A of the channel bit signal reproducing portion 5, which forms it into a square wave by zero-crossing to thereby detect the channel bit signal stream CHBr. The sync signal and clock signal of the channel bit are detected from the detected channel bit signal stream CHBr.

The channel bit signal stream CHBr detected by the channel bit signal reproducing portion 5 is decoded and error-corrected by a digital signal processor, and then output as digital information data. The channel bit signal reproducing portion 5 is formed including the zero-crossing circuit 5A.

Referring to FIG. 4, the zero-crossing circuit 5A includes a comparator 25 for receiving the high-frequency playback signal RFe output from the equalizer 4 as its non-inverted input+, a buffer 26 for buffering the signal output from the comparator 25 and then outputting the playback channel bit signal stream CHBr, and an integrator 27 for integrating the output of the buffer 26. A differential amplifier 28 receives the output of the integrator 27 as its non-inverted input+, amplifies the difference between it and a reference voltage sent to its inverting port−, and outputs a reference voltage to the inverting port−of the comparator 25. A variable resistor VRI is connected to the inverting input port−the differential amplifier 28 and outputs the reference voltage as the inverted input of the differential amplifier 28.

The integrator 27 comprises a resistor R2 with one terminal connected to the output port of the buffer 26, a capacitor C2 connected between the other terminal of the resistor R2 and the ground, a resistor RI connected to the other terminal of the resistor R2 and the non-inverting input port+ of the differential amplifier 28, and another capacitor C1 connected between the non-inverting input port+ of the differential amplifier 28 and the ground. With these components, the integrator 27 integrates the channel bit signal stream CHBr.

In the zero-crossing circuit of FIG. 4, when the high-frequency playback signal RFe equalized by the equalizer 4 is input to the non-inverting input port+ of the comparator 25, the comparator 25 compares it with the reference voltage input to its inverting input port–. The signal output from the comparator 25 is generated as a square wave via the buffer 26 so that the output channel bit signal stream CHBr is zero-crossed.

The square wave of the channel bit signal stream CHBr from the buffer 26 is integrated in the integrator 27 made up with resistors R1 and R2 and capacitors C1 and C2 to generate a reference voltage which is applied to the non-inverting input port+ of the differential amplifier 28. The level zero of signal output from the integrator 27 is detected by the differential amplifier 28 and the variable resistor VR1, and then applied to the inverting input port– the comparator 25 as its reference voltage. Here, the ratio of LOW and HIGH levels of the zero-crossed channel bit signal is set to be 1 to correct asymmetry of the disk.

The playback channel bit clock (not shown) detected from the channel bit signal stream CHBr is a clock periodically changed and reproduced in accordance with the time of changing the states from 0 to 1 or from 1 to 0 in the channel bit signal stream CHBr. This clock must have a small time jitter with respect to a reference signal (channel bit clock in recording). The clock reproduced in the optical disk recording/reproducing apparatus shown in FIG. 1 generates the time jitter which must be suppressed below a predetermined level. With a big jitter, playback cannot be performed accurately. Thus, the jitter must be below 10% in the optical disk recording/reproducing apparatus.

A jitter appears to be great at about level 0 in zero-crossing due to electric noise, interference between channel bits, or crosstalk between nearby signal tracks. Therefore, a jitter can be removed by eliminating the signals affecting, level 0 or the reproduced high-frequency signal RF. Here, in order to minimize the effect due to the interference between signals preceding and succeeding at a time axis, an equalizer 4 is employed.

The equalizer shown in FIGS. 3A and 3B removes the signal affecting the playback signal in the sensitivity of –α at a preceding or succeeding time τ. In other words, the playback signal is affected symmetrically backward and forward along the time axis. As shown in FIG. 2A, a circular light beam is projected on the signal tracks recorded in the stream of pits. These pit signals are read by rotating the magnetooptical disk 1 at a predetermined velocity.

The main light beam LB for reading the playback signal shown in FIG. 2B is distributed as in FIG. 5A. The starting point of a pit signal is put on the center of the main light beam for reading signals. Here, the variation of light amount reflected when the length of the pit signal varies and the variation of light amount reflected when the distance of the preceding mirror surface varies are different and are shown in FIGS. 6A and 6B.

FIG. 5C is a sectional view of a signal track of a disk. FIGS. 5D and 5E show the variation of playback signal (high-frequency signal) when the light beam is projected onto such signal tracks. As shown in FIGS. 5D and 5E, the signal voltage (corresponding to the reference voltage zero-crossed) at a point where the mirror surface and signal pit come into contact is almost uniform and varies within several % of the playback signal.

Given that the length of signal pit corresponding to one channel bit in EFM (Eight to fourteen) modulation method is T, the length of signal pit and the distance of the mirror surface between signal pits become 3, 4, 5, 6, 7, 8, 9, 10, and 11 T.

When the mirror surface is placed ahead and the signal pit is behind as shown in FIG. 5C, the variation of light amount reflected when the distance of the preceding mirror surface is shown in FIG. 6A. The variation of light amount reflected when the length of signal pit is uniform (i.e., 3T or 7T) and the distance of mirror surface varies (3, 4, 5, 6, 7, and 8T) is shown in FIG. 6B.

When FIGS. 6A and 6B are compared, the variation of signal due to the distance variation of the mirror surface and the variation of signal due to the length variation of signal pit are different. It is noted that the effect due to the length variation of pit is about two times of the effect due to the distance variation of the mirror surface. If the positions of the mirror surface and signal pit are reversed as shown in FIG. 5C, the variation of light amount reflected when the distance of the succeeding mirror surface is uniform and the length of the preceding signal pit varies (3, 4, 5, 6, 7, and 8T) is shown as in FIG. 6A. The variation of light amount reflected when the length of the preceding signal pit is uniform and the distance of the succeeding mirror surface varies (3, 4, 5, 6, 7, and 8T) is shown in FIG. 6B.

FIG. 6A shows the variation when the distance of the mirror surface is fixed as being 3T (represented by the GRp3 curve) and the length of signal pit varies into 3, 4, 5, 6, 7, and 8T. FIG. 6A also shows the variation when the distance of the mirror surface is fixed as being 7T (the GRp7 curve) and the length of signal pit varies into 3, 4, 5, 6, 7, and 8T. If the length of signal pit is over 7T, the curves become almost flat without big variations. If the distance of the mirror surface is over 6T, the curve becomes almost the same as the GRp7 (graph without large variations.

If the distance of the mirror surface is 4T or 5T, the corresponding curve is between the GRp3 and GRp7 curves shown in FIG. 6A, and the shape of the respective curve is similar to Grp3 and Grp7. If the respective curves are differentiated with respect to the variation of signal pit, the curve has a predetermined shape as the DGp curve of FIG. 7.

FIG. 6B shows the variation when the length of signal pit is 3T (represented by the GRm3 curve) and the distance of the mirror surface varies into 3, 4, 5, 6, 7, and 8T. FIG. 6B also shows the variation when the length of signal pit is 7T (the GRm7 curve) and the distance of the mirror surface varies into 3, 4, 5, 6, 7, and 8T. If the distance of the mirror surface is over 6T, the curves become almost flat without big variations. If the length of signal pit is over 7T, the curve becomes almost the same as the GRm7 curve without large variations.

If the length of signal pit is 4T, 5T or 6T, the corresponding curve is between the GRm3 and GRm7 shown in FIG. 6B and has a similar shape as that of Grm3 or Grm7. If the respective curves are differentiated with respect to the variation of signal pit, the curve has a predetermined shape as the DGm curve of FIG. 7.

Symmetry would be ensured if FIGS. 6A and 6B have the opposite polarities but the same variation rate, and if the peaks of FIG. 7 are located at the same position. However, as shown in FIGS. 6A, 6B, and 7, symmetry is not guaranteed because the variation rates due to the length variation of signal pit and the distance variation of the mirror surface are not the same. According to the characteristics of reproducing the signal of disk by the optical pickup 2 in FIG. 1. the effects of the preceding and succeeding signals are not symmetric. Therefore, the symmetric equalizer shown in FIG. 3 cannot completely equalize the high-frequency playback signal. Consequently, the reproduced channel bit signal contains inherent jitter due to the signal playback characteristic of the optical pickup 2.

SUMMARY OF THE INVENTION

Accordingly, the present invention is directed to an optical disk recording/reproducing apparatus that substantially obviates one or more of the problems due to limitations and disadvantages of the related art.

An object of the present invention is to provide an optical disk recording/reproducing apparatus in which the characteristic of the equalizer is designed asymmetrically to compensate for the asymmetrical effect due to the interference of preceding and succeeding symbols of a pit signal in reproducing a disk. This reduces the jitter of the channel bit signal obtained by the zero-crossing circuit and accordingly enhances the playback performance of a magnetic recording/reproducing apparatus.

Another object of the present invention is to provide an optical disk recording/reproducing apparatus in which the reference voltage of the zero-crossing circuit for detecting the reproduced channel bit signal is controlled by the preceding and succeeding symbols, thereby reducing the time jitter of the channel bit signal and in turn enhancing the playback performance of the reproducing apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical disk recording/reproducing apparatus of the present invention includes: an optical pickup for recording and reproducing information onto/from a disk; playback signal processing means for receiving electrical signals output from the optical pickup and for outputting a focus control signal, tracking control signal, and high-frequency playback signal; asymmetric equalizing means for correcting the high-frequency playback signal distorted and output from the playback signal processing means due to the optical pickup's asymmetric playback characteristic; and channel bit signal playback means for zero-crossing the high-frequency playback signal equalized and output from the equalizing means and for outputting it as a channel bit signal stream of square wave.

In another aspect, an optical disk recording/reproducing apparatus of the present invention for reproducing an optical disk where information signals are recorded in serial pits on spiral signal tracks includes: an optical pickup for recording and reproducing information onto/from a disk; playback signal processing means for receiving electrical signals output from the optical pickup and for outputting a focus control signal, tracking control signal, and highfrequency playback signal; equalizing means having a plurality of equalizers suitable for respective optical disk types and for equalizing the high-frequency playback signal output from the playback signal processing means; control means for detecting the kind of a disk reproduced and outputting a control signal corresponding to the disk; selection means for selecting an equalizer corresponding to the detected disk and outputting a high-frequency playback signal equalized in the selected equalizer according to the control of the control means; and channel bit signal playback means for zero-crossing the equalized high-frequency playback signal output from the selection means by zero-crossing circuit so as to detect a channel bit signal stream of square wave.

In a further aspect, an optical disk recording/reproducing apparatus of the present invention for reproducing an optical disk where information signals are recorded includes: an optical pickup for recording and reproducing information onto/from a disk; playback signal processing means for receiving electrical signals output from the optical pickup and for outputting a focus control signal, tracking control signal, and high-frequency playback signal; equalizing means for correcting the high-frequency playback signal distorted and output from the playback signal processing means due to the optical pickup's asymmetric playback characteristic; channel bit signal playback means having a plurality of zero-crossing circuits suitable for respective optical disk types and for zero-crossing the equalized high-frequency playback signal output from the equalizing means by the respective zero-crossing circuits so as to detect a channel bit signal stream of square wave; control means for detecting the kind of a disk reproduced and outputting a control signal corresponding to the disk; and selection means for selecting a zero-crossing circuit corresponding to the detected disk and outputting a channel bit signal stream detected by the selected zero-crossing circuit under the control of the control means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIG. 2C illustrates the arrangement of the photodetectors of the optical pickup of FIG. 1;

FIGS. 16A–16E are operational waveform diagrams of the respective portions of FIG. 15;

DETAILED DESCRIPTION OF THE PREFERRED EMBODIMENTS

Reference will now be made in detail to the preferred embodiments of the present invention, examples of which are illustrated in the accompanying drawings.

Figure 8:
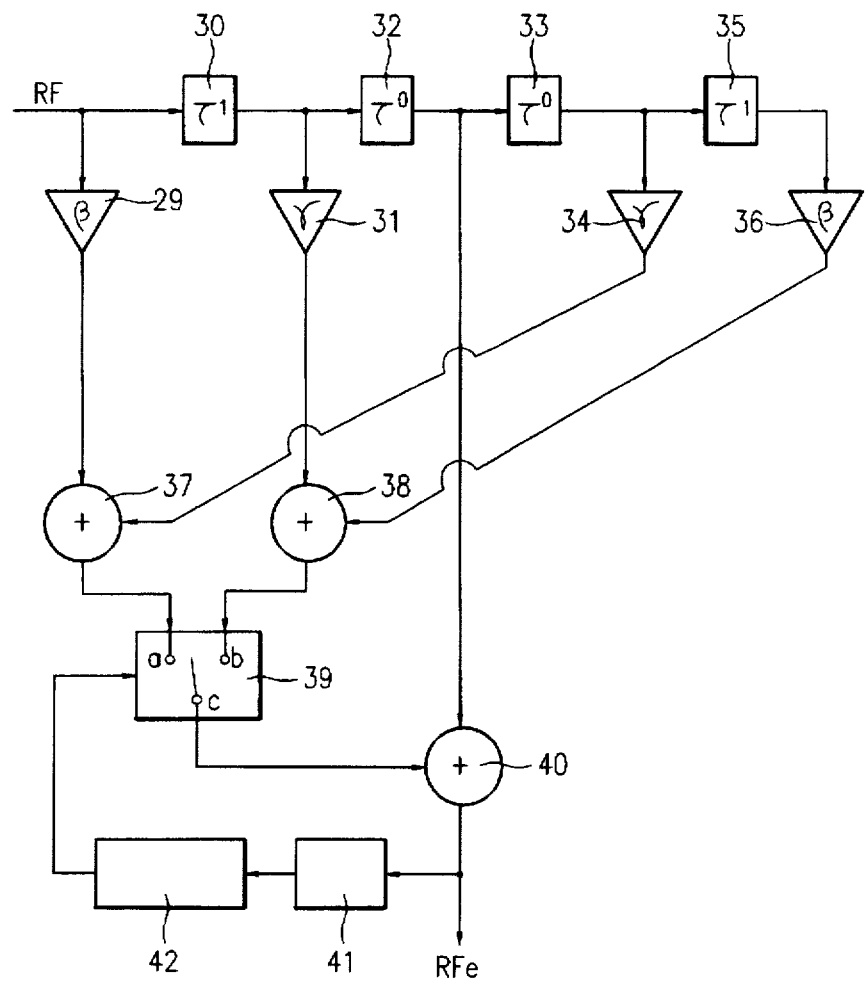
FIG. 8 is a detailed block diagram of an asymmetric three-tap equalizer in an optical disk recording/reproducing apparatus of the present invention.

FIG. 8 is a detailed block diagram of an asymmetric three-tap equalizer in the optical disk recording/reproducing apparatus of the present invention. In this drawing, all portions except the equalizer are the same as those of FIG. 1, and will be omitted.

The equalizer of FIG. 8 comprises delay circuits 30,32, 33,35 for sequentially delaying the high-frequency playback signal RF output from the playback signal processing portion 3. Amplifiers 29,31,34 and 36 amplify the high-frequency playback signal RF and the outputs of the delay circuits 30,33 and 35 according to the respective gains $\beta$ and $\gamma$. A first summer or adder 37 sums the outputs of the amplifiers 29 and 34, and a second summer 38 sums the outputs of the amplifiers 31 and 36. A selector 39 selectively outputs the output of the first or second summer 37 or 38 according to a selection signal. A third summer 40 sums the playback signal output from the delay circuit 32 and the signal output from the selector 39 to output an equalized high-frequency playback signal RFe. A differentiator 41 differentiates the output of the third summer 40. A zero-crossing circuit 42 zero-crosses the output of the differentiator 41 to form it into a square wave and thus output it as the selection signal of the selector 39. Here, the gains $\beta$ and $\gamma$ of the amplifiers 29 and 34 (summed in the first summer 37) are different. The gains $\gamma$ and $\beta$ of the amplifiers 31 and 36 (summed in the second summer 38) are also different. Even their temporal positions are different i.e., $\tau°$ and $\tau'$, respectively. Therefore, the above equalizer is asymmetric.

$$\gamma = DVm/Vm33 \qquad (6)$$

Figure 9A:
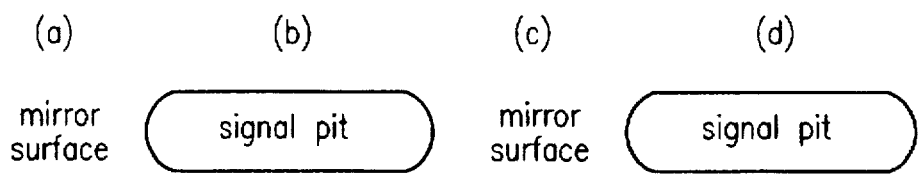
FIGS. 9A–9D are signal waveform diagrams of the respective portions of FIG. 8.
Figure 9B:
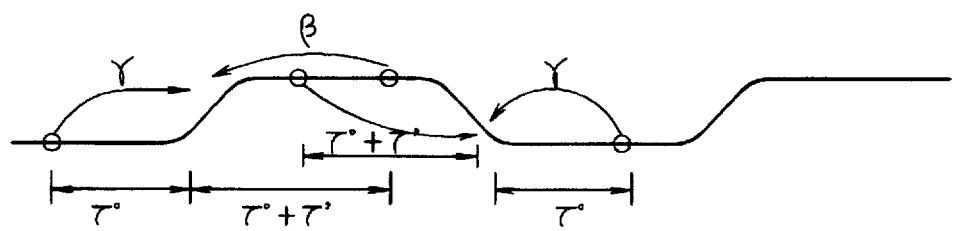
Figure 9C:
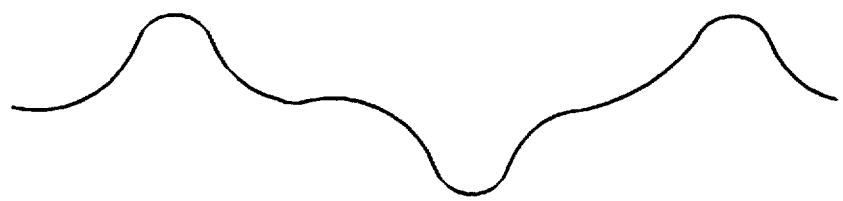
Figure 9D:
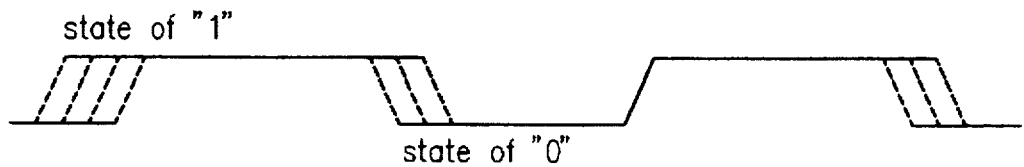

Here, the effects from the preceding and succeeding signals are different according to the sequential relation of the mirror surface and the signal pit. More specifically, as shown in FIG. 9A, the effects become different when the mirror surface "a" is placed in front of signal pit "b" and when it is at the back of signal pit "b". For this reason, if compensations are individually performed for the respective cases, the jitter effect can be offset more effectively. The high-frequency playback signal RF or equalized high-frequency playback signal RFe shown in FIG. 9B is differentiated as shown in FIG. 9C, and zero-crossed as shown in FIG. 9D to form a square wave. This square wave causes the selector 39 to switch so that the effect at the portion where mirror surface "a" changes to signal pit "b" or signal pit "b" changes to mirror surface "c" as in FIG. 9A is faithfully controlled to offset the effect and thus minimize the generation of jitter.

More specifically, as shown in FIG. 9B, when the high-frequency playback signal RF or the equalized high-frequency playback signal RFe from the third summer 40 is differentiated in the differentiator 41, a differentiated signal is output as shown in FIG. 9C. This output is zero-crossed in the zero-crossing circuit 42 so that a square wave is output as shown in FIG. 9D. Here, if the square wave of FIG. 9D is in a HIGH state, i.e., if the playback is performed from the mirror surface "a" to signal pit "b", the selector 39 selects the output of the first summer 37 to be sent to the third summer 40.

The first summer 37 sums the output of the amplifier 29, which amplifies by gain $\beta$ (the effect at signal pit "b") the signal $\tau°+\tau'$ after the playback signal output from the delay circuit 32, and the output of amplifier 34, which amplifies by gain $\gamma$ (the effect by mirror surface "a")

In the configuration of FIG. 8, when the high-frequency playback signal RF is input from the playback signal processing portion 3, it is sequentially delayed by the delay circuits 30, 32, 33 and 35. The high-frequency playback signal RF and the delayed outputs of the delay circuits 30,33 and 35 are amplified using predetermined gains $\beta$ and $\gamma$ by the amplifiers 29,31,34 and 36, respectively.

Figure 7:
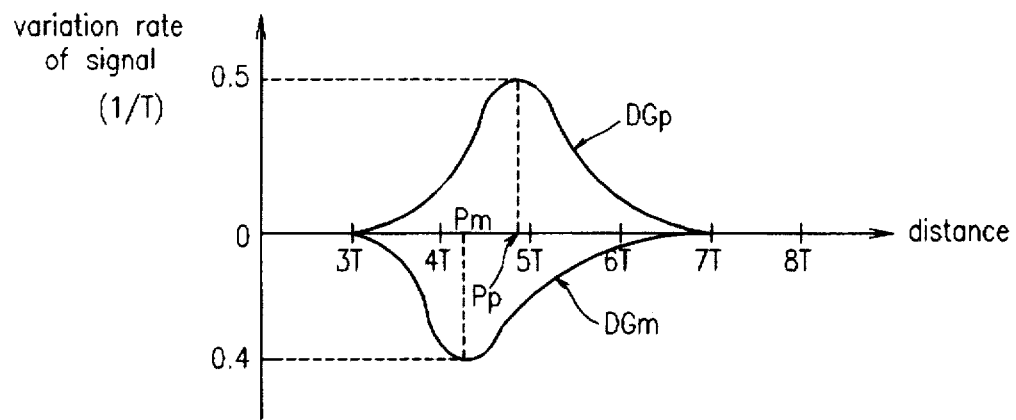
FIG. 7 is a graph of differentiating the graphs of FIGS. 6A and 6B.

$\tau°$ and $\tau'$ are delay times of the respective delay circuits 30, 32, 33 and 35. $\tau'$ is a value obtained by dividing the difference $\Delta$ ($\Delta$=Pp-Pm) by the rotation velocity V (i.e., the playback speed of the disk):

$$\tau' = \Delta/V \qquad (1)$$

where a is the difference between the pit length of the peak Pp and the distance of the mirror surface of the peak Pm, that is, the difference of the positions of the peaks Pp and Pm in FIG. 7. $\tau°$ is obtained by dividing Pmin (the smaller value between distance Pm of the mirror surface and pit length Pp in FIG. 7), by the playback speed V:

$$\tau° = Pmin/V \qquad (2)$$

Generally, the value Pm is smaller than value Pp. In this invention, the value Pmin is Pm.

Figure 6A:
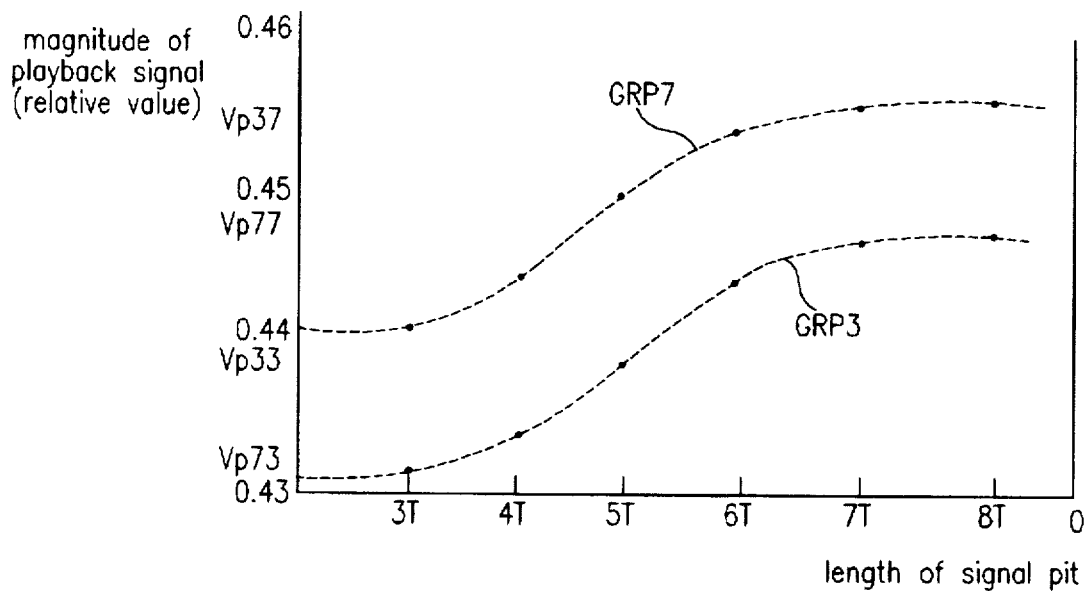
FIGS. 6A and 6B are graphs of showing the effect of the playback signal due to the nearby pit signal in FIG. 1.
Figure 6B:
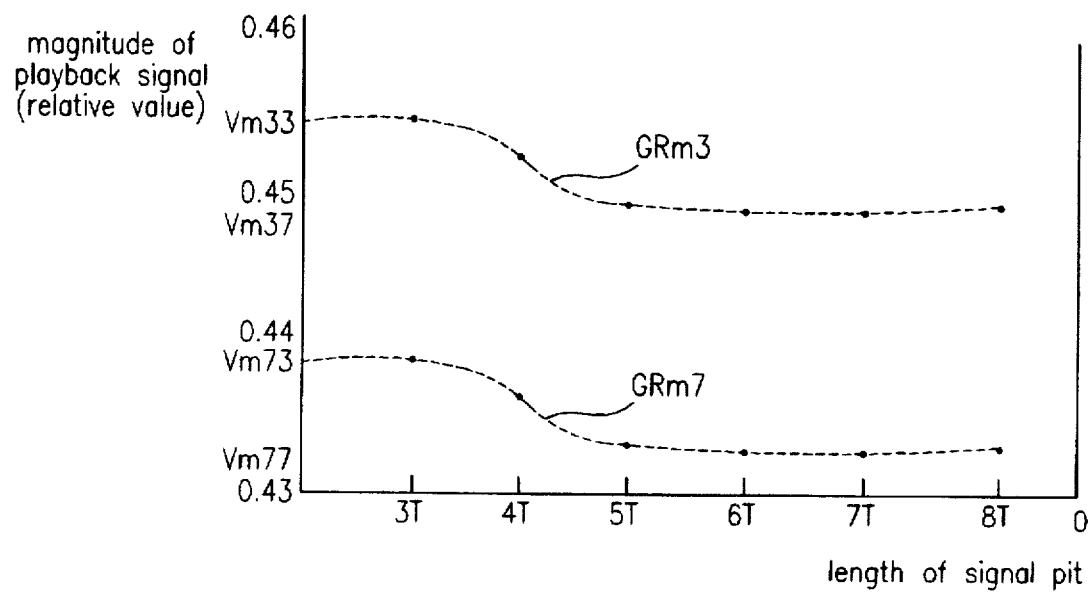

$\beta$ is the gain of the amplifiers 29 and 36; $\gamma$ is the gain of the amplifiers 31 and 34. Given that the variations of the curves shown in FIGS. 6A and 6B are DVp and DVm, respectively, we have the following relationships:

$$DVp = Vp37 - Vp33 \quad (3)$$

$$\beta = DVp/Vp33 \quad (4)$$

$$DVm = Vm37 - Vm33 \quad (5)$$

the signal τ° before the playback signal. In case that playback is performed from mirror surface "a" to signal pit "b" the third summer 40 sums the playback signal output from the delay circuit 32 and the output of the first summer 37 via the selector 39 so that the equalized high-frequency playback signal RFe is output to the differentiator 41 and the channel bit signal reproducing portion 5.

Likewise, if the square wave of FIG. 9D is in a LOW state, i.e., if the playback is performed from signal pit "b" to mirror surface "c" as shown in FIGS. 9A and 9B, the selector 39 selects the output of the second summer 38 to be sent to the third summer 40.

The second summer 38 sums the output of the amplifier 36 which amplifies by gain β (the effect at signal pit "b") the signal τ°+τ' before the playback signal output from the delay circuit 32, and the output of the amplifier 31, which amplifies by gain γ (the effect by mirror surface "c") the signal τ° after the playback signal. In case that playback is performed from signal pit "b" to mirror surface "c" the third summer 40 sums the playback signal output from the delay circuit 32 and the output of the second summer 38 via the selector 39 so that the equalized high-frequency playback signal RFe is output to the differentiator 41 and the channel bit signal reproducing portion 5.

At a portion where the high-frequency playback signal RF is the maximum or minimum, a value differentiated by the differentiator 41 approximates level 0. Here, the square wave converted by the zero-crossing circuit 42 may repeat its HIGH and LOW states. However, this case does not affect the jitter, and thus involves no problem.

Figure 10:
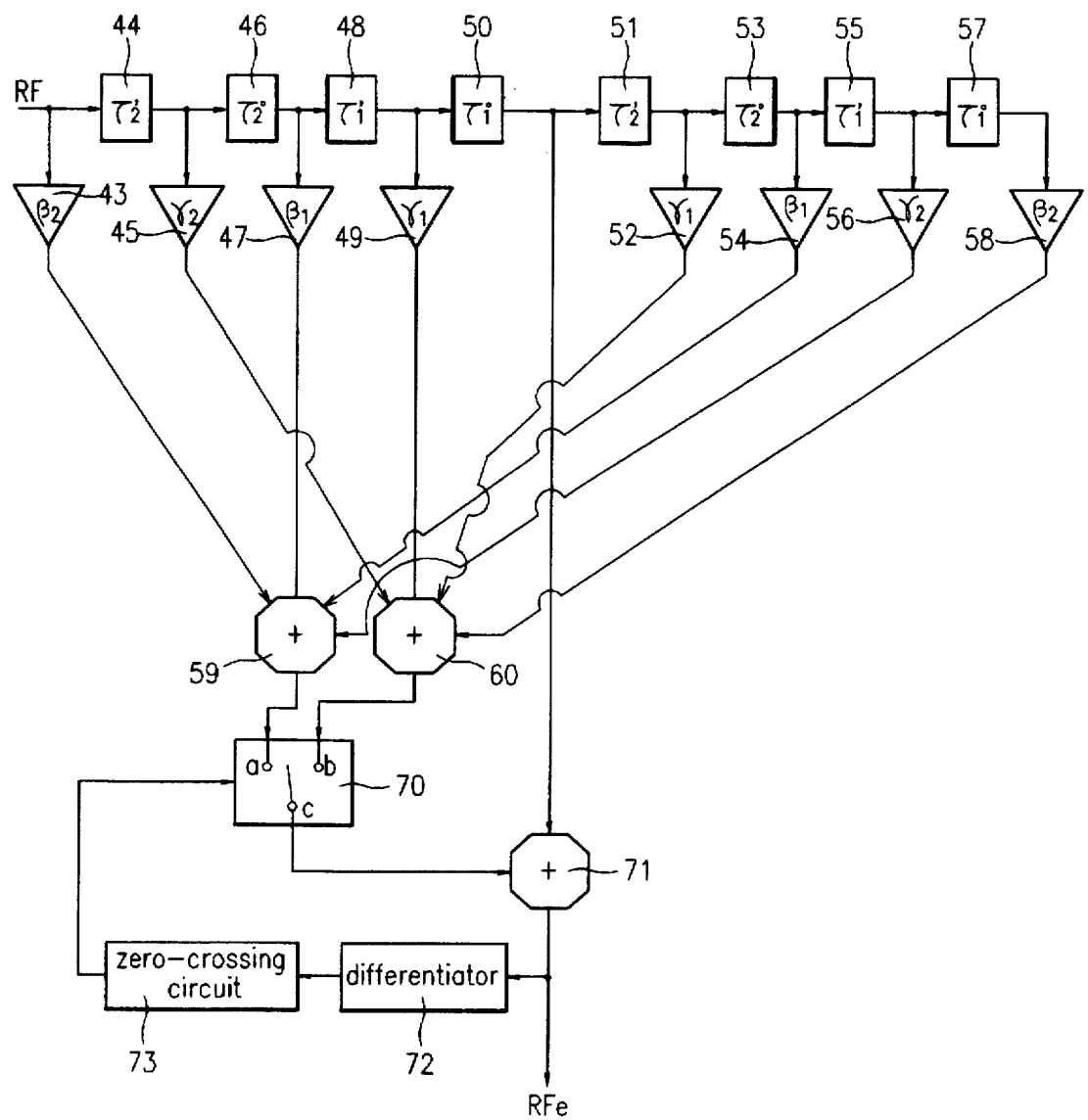
FIG. 10 is a detailed block diagram of an asymmetric five-tap equalizer in the optical disk recording/reproducing apparatus of the present invention.

Referring to FIG. 10, the five-tap equalizer of the present invention comprises delays 44, 46, 48, 50, 51, 53, 55 and 57 for sequentially delaying the high-frequency playback signal RF from the playback signal processing portion 3. Amplifiers 43, 45, 47, 49, 52, 54, 56, and 58 amplify the high-frequency playback signal RF and the outputs of the delays 44, 46, 48, 51, 53, 55 and 57 to the respective gains β2, γ2, β1, and γ1. A first summer 59 sums the outputs of the amplifiers 43, 47, 52 and 56, and a second summer 60 sums the outputs of the amplifiers 45, 49, 54 and 58. A selector 70 selectively outputs the output of the first summer 59 or second summer 60 according to a selection signal. A third summer 71 sums the playback signal output from the delay 50 and the output of the selector 70 to output an equalized high-frequency playback signal RFe. A differentiator 72 differentiates the output of the third summer 71, and a zero-crossing circuit 73 zero-crosses the output of the differentiator 72 to form it as a square wave and then output it as the selection signal for the selector 70.

Here, the gains of the amplifiers 43, 47, 52 and 56 summed in the first summer 59 are different as being β2, β1, γ1 and γ2, respectively. The gains of the amplifiers 45, 49, 54 and 58 summed in the second summer 60 are different as being γ2, γ1, β1 and β2, respectively. Their temporal positions are different as being τ°₂, τ'₂, τ°₁, and τ'₁. Therefore, the equalizer is asymmetric. In FIG. 10, the effects due to the preceding and succeeding signals are different according to the sequential relation of the mirror surface and signal pit, similar to FIG. 8.

When the qualified high-frequency playback signal RFe output from the third summer 71 is differentiated in the differentiator 72, this differentiated signal is zero-crossed by the zero-crossing circuit 73 and a square wave is output. Here, if the zero-crossed square wave is in HIGH state, i.e., if playback is performed from the mirror surface to the signal pit, the selector 70 selects the output of the first summer 59 to be the output sent to the third summer 71.

Here, the first summer 59 sums the output of the amplifier 43 which β2-time amplifies (the effect at the succeeding signal pit) the signal τ°₁+τ'₁+τ°₂+τ'₂ after the playback signal output from the delay 50, the output of amplifier 47 which β1-time amplifies (the effect at the succeeding signal pit) the signal τ°1+τ'1 after the playback signal, the output of amplifier 52 which γ1-time amplifies (the effect by the front mirror surface) the signal τ°₁ before the signal, and the output of amplifier 56 which γ2-time amplifies (the effect by the front mirror surface) the signal τ°1+τ'1+τ°2 before the signal.

Figure 1:
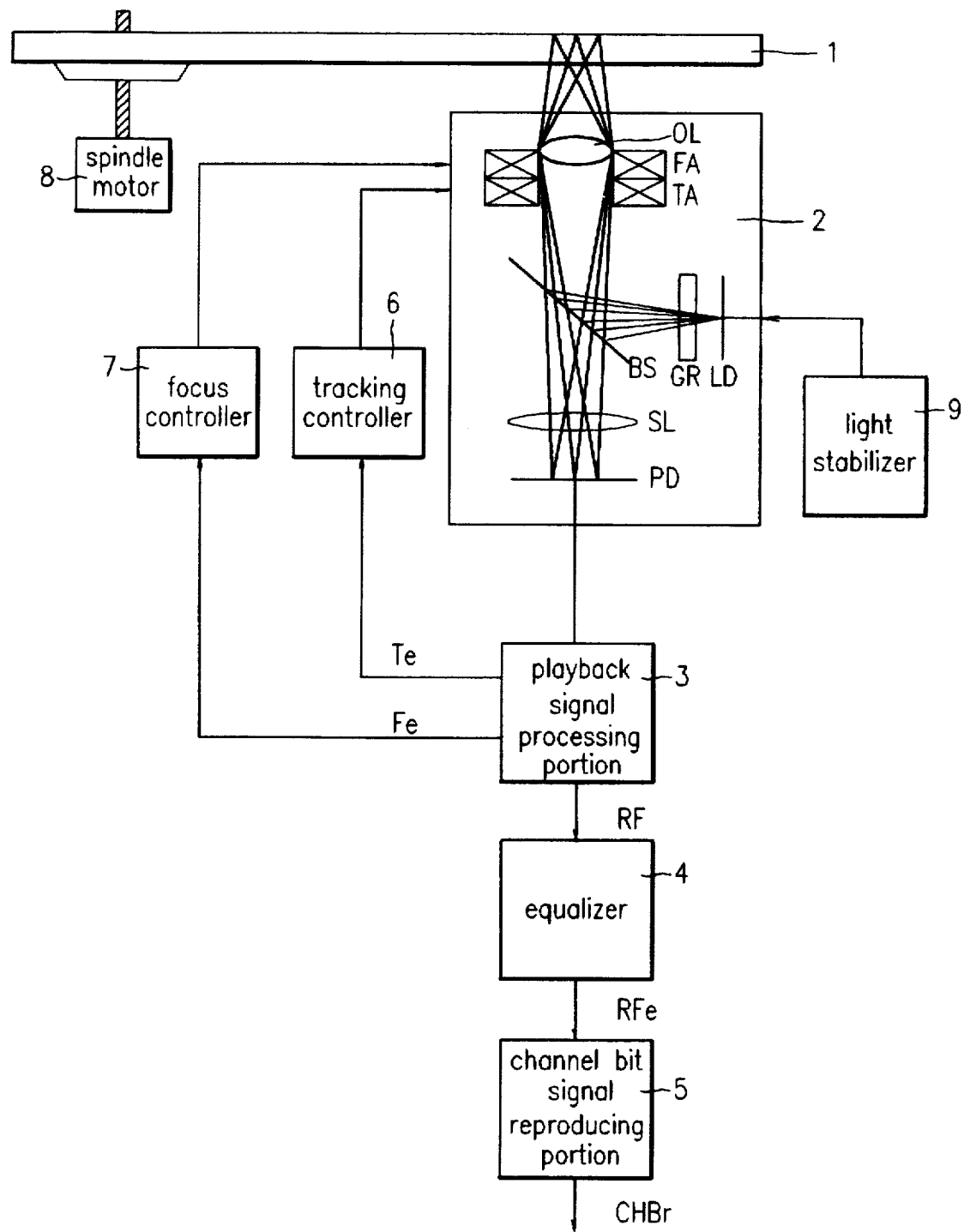
FIG. 1 is a block diagram of a general optical disk recording/reproducing apparatus.
Figure 2A:
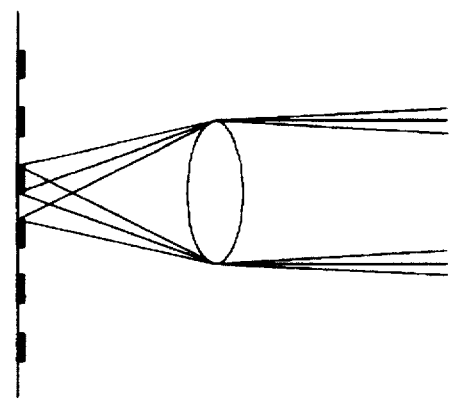
FIGS. 2A and 2B illustrate the arrangement of the laser beam on the optical disk through the objective lens of FIG. 1.
Figure 2B:
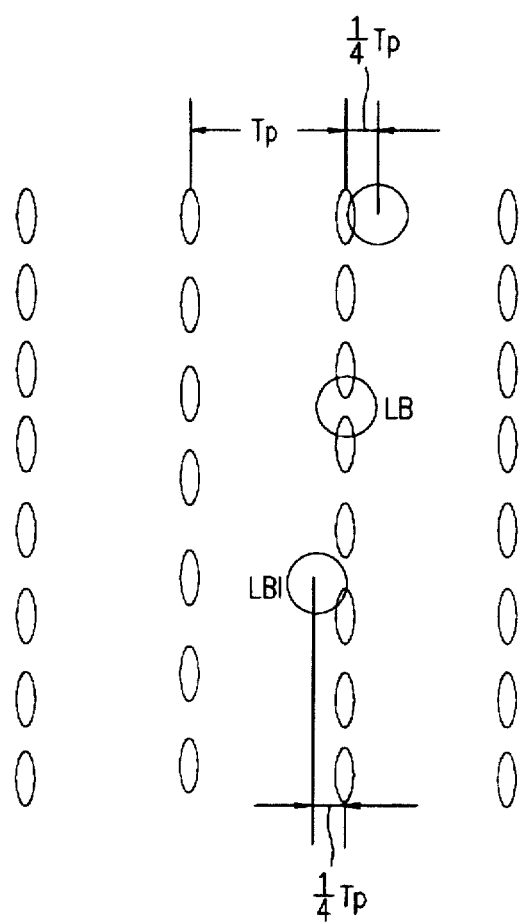
Figure 3A:
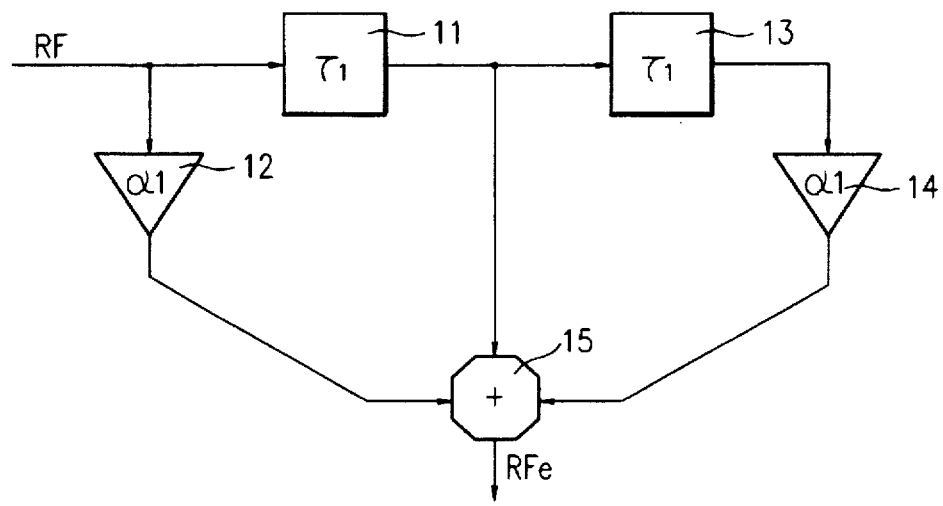
FIG. 3A is a block diagram of a general symmetric three-tap equalizer of FIG. 1.
Figure 3B:
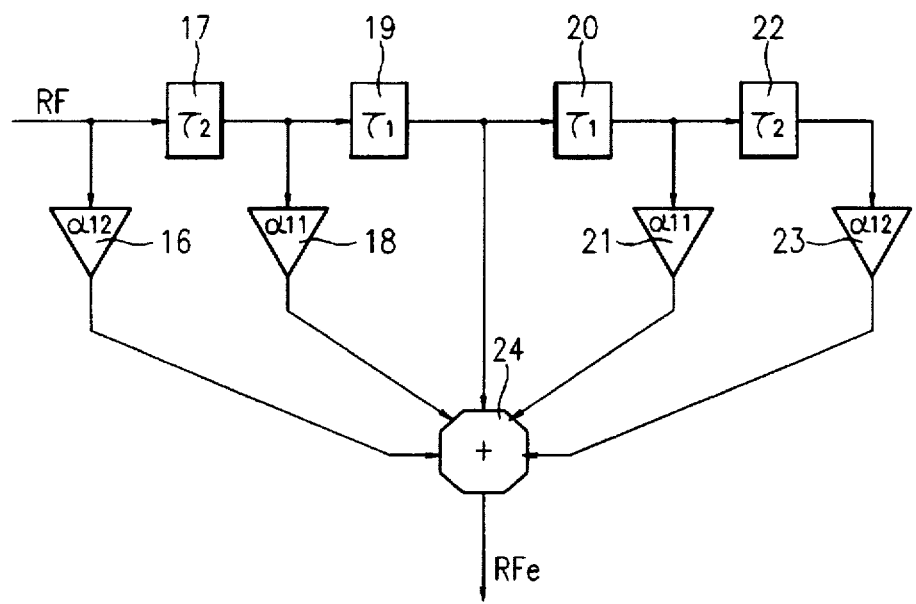
FIG. 3B is a block diagram of a general symmetric five-tap equalizer of FIG. 1.
Figure 4:
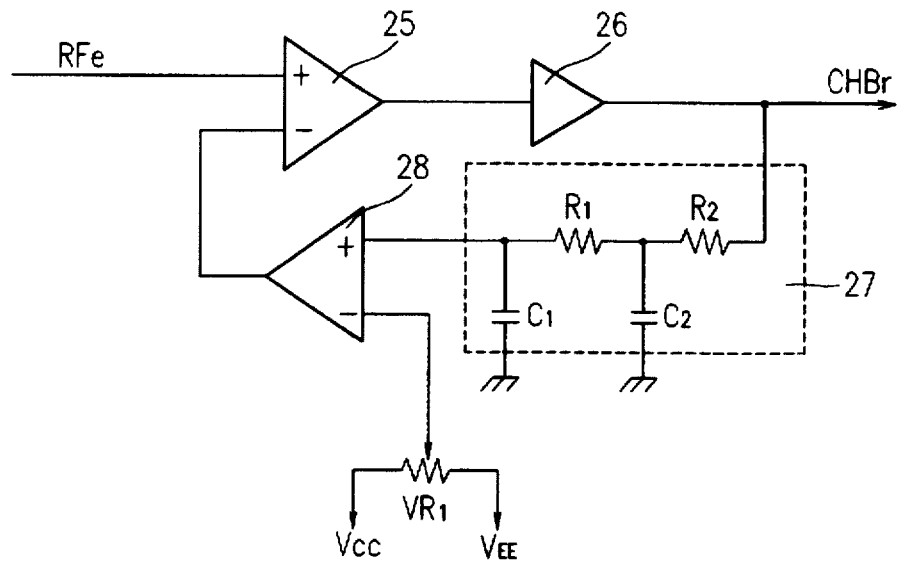
FIG. 4 is a circuit diagram of the zero-crossing circuit of FIG. 1.

In case that playback is performed from the mirror surface to the signal pit, the third summer 71 sums the playback signal output from the delay 50 and the output of the first summer 59 via the selector 70, and outputs the equalized high-frequency playback signal RFe to the differentiator 72 and the channel bit signal reproducing portion 5 (see FIG. 1).

Likewise, if the zero-crossed square wave is in LOW state, i.e., the playback is performed from the signal pit to the mirror surface, the selector 70 selects the output of the second summer 60 to be the output sent to the third summer 71. Here, the second summer 60 sums the output of the amplifier 58 which β2-time amplifies (the effect at the preceding signal pit) the signal τ°₁+τ'₁+τ°₂+τ'₂ before the playback signal output from the delay 50, the output of the amplifier 54 which β1-time amplifies (the effect at the preceding signal pit) the signal τ°₁+τ'₁ before the playback signal, the output of the amplifier 49 which γ1-time amplifies (the effect by the succeeding mirror surface) the signal τ°1 after the signal, and the output of amplifier 45 which γ2-time amplifies (the effect by the succeeding mirror surface) the signal τ°₁+τ'₁+τ°₂ after the signal.

In case that playback is performed from the mirror surface to the signal pit, the third summer 71 sums the playback signal output from the delay 50 and the output of the second summer 60 via the selector 70, and outputs the equalized high-frequency playback signal RFe to the differentiator 72 and the channel bit signal reproducing portion 5 (see FIG. 1). At a portion where the high-frequency playback signal RFe is the maximum or minimum, a value differentiated by the differentiator 42 approximates level 0. Here, the square wave converted by the zero-crossing circuit 73 may repeat its HIGH and LOW states. However, this case does not affect the jitter, and thus involves no problem.

As discussed above, the asymmetric three-tap equalizer or five-tap equalizer shown in FIG. 8 or 10 can be easily designed with delays and amplifiers of coil and capacitance or a digital circuit or operators.

Figure 11:
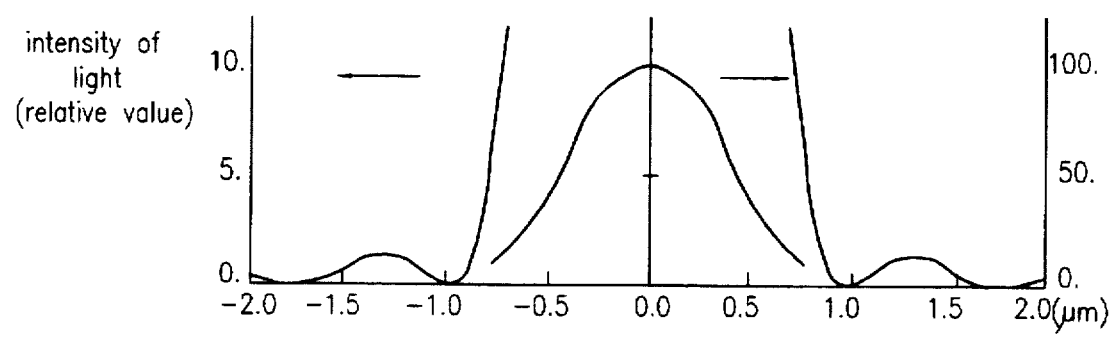
FIG. 11 is a graph of showing the distribution of the converged laser beams when there is a tilt in the disk.

Meanwhile, if the disk 1 and the optical pickup 2 must be parallel in the optical disk reproducing apparatus, the playback characteristics can be maintained as shown in FIGS. 8 and 10. But in reality, they are not parallel, and there is usually a tilt. When there is a tilt of the disk 1, the light distribution of the beams converged on the disk surface varies asymmetrically. FIG. 11 shows a light distribution when the tilt of the disk is 0.3°. According to this drawing, the light distributions of the preceding and succeeding sidelobes are asymmetric.

Figure 12A:
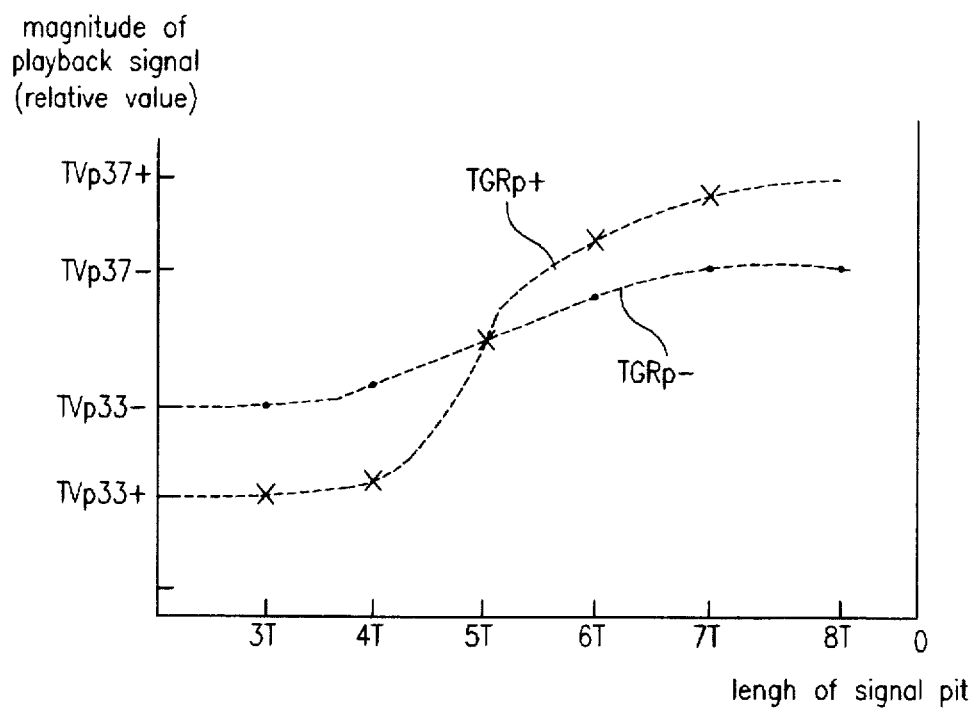
FIGS. 12A and 12B are graphs of showing the effect of the playback signal by the nearby pit signal when there is a tilt in the disk.
Figure 12B:
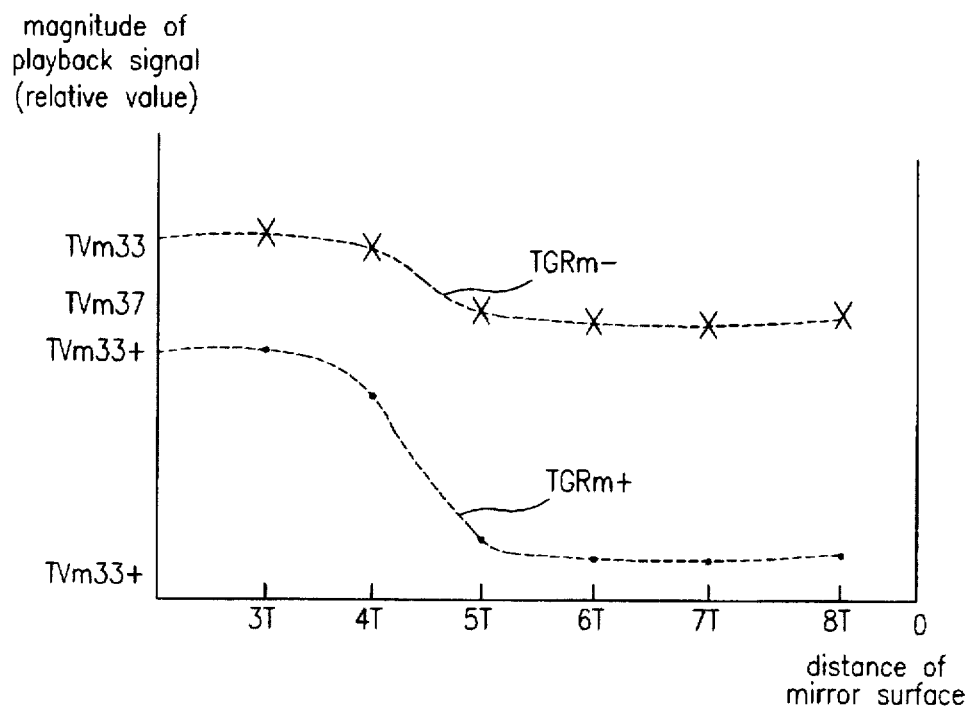

TGRp+curve of FIG. 12A shows the variation of light amount reflected when the distance of the preceding mirror surface is constant but the length of (3T) signal pit is changed into 3T, 4T, 5T, 6T, 7T, and 8T (corresponding to FIG. 6A). On the contrary. TGRm+curve of FIG. 12B shows the variation of light amount reflected when the length of signal pit is constant but the length of the preceding mirror surface is changed into 3T, 4T, 5T, 6T, 7T, and 8T. TGPp-curve of FIG. 12A shows the variation of light amount reflected when the distance of the succeeding mirror surface is constant but the length of the preceding signal pit is changed into 3T, 4T, 5T, 6T, 7T, and 8T. TGRm-curve of FIG. 12B shows the variation of light amount reflected when the length of signal pit is constant but the length of the succeeding mirror surface is changed into 3T, 4T, 5T, 6T, 7T, and 8T.

Figure 5A:
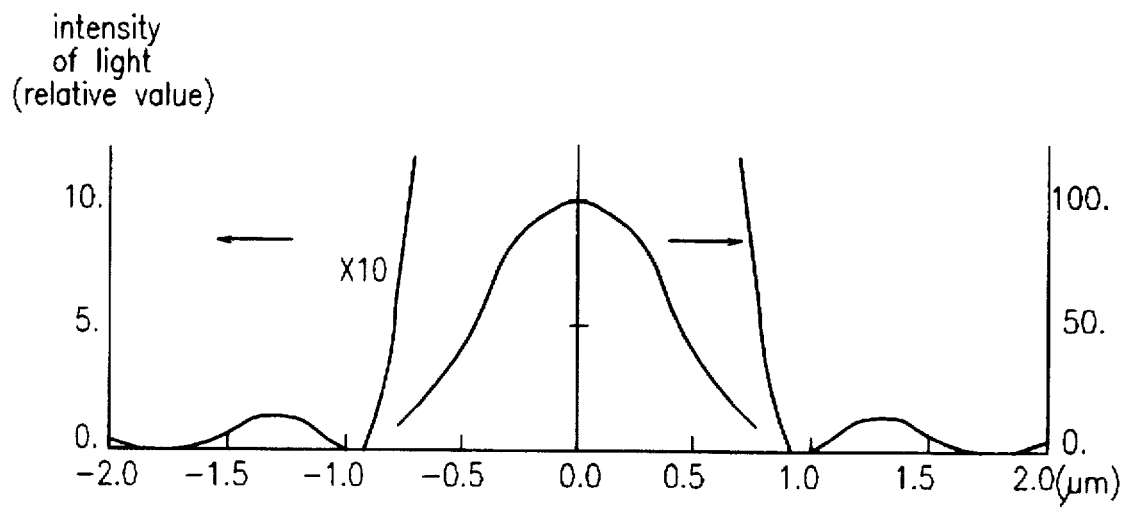
FIG. 5A is a graph of the distribution of the light beams converged by the optical pickup of FIG. 1.
Figure 5B:
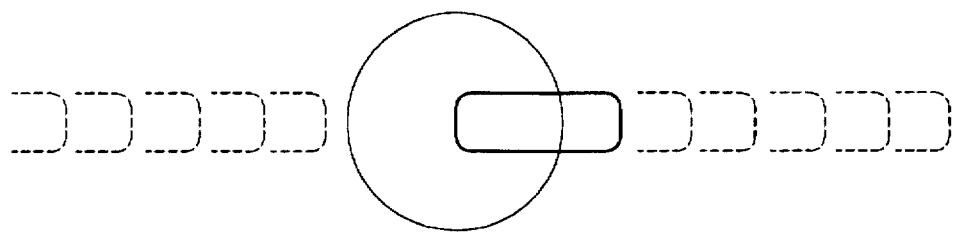
FIG. 5B illustrates the arrangement of the signal pits on the tracks of the optical disk and the laser beams during playback.
Figure 5C:
FIG. 5C is a sectional view of the tracks of the optical disk.
Figure 5D:
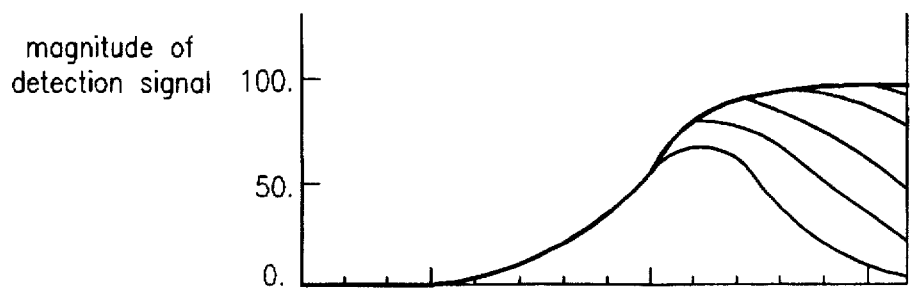
FIGS. 5D and 5E are waveform diagrams of the playback signal when the magnitude of the signal pit and the size of the mirror surface vary.
Figure 5E:
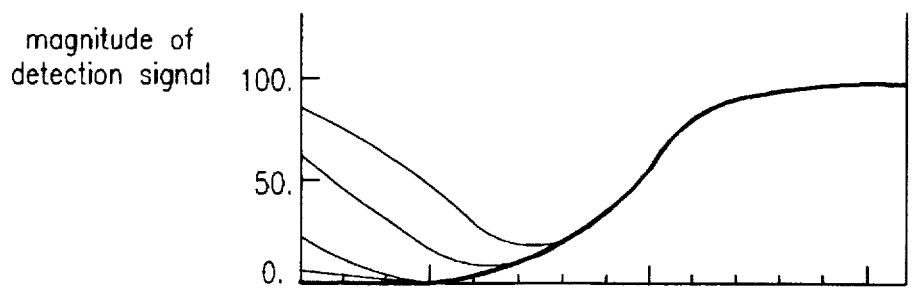

If the light distribution is symmetric as shown in FIG. 5A, the variation of light amount is the same even when the mirror surface and pit signal are reversed. However, in case that there is a tilt of disk 1 and the light distribution is asymmetric as shown in FIG. 11, the variation of light amount changes when the mirror surface and pit signal are reversed. If the preceding effect increases, the succeeding effect is reduced. Therefore, the effect for the signal of one pit or of one mirror surface between pits is constant. More specifically, the variation in case that the mirror surface is placed in front and the signal pit is placed therebehind is as the following:

$$DTVp+ = (TVp37+) - (TVp33-) \qquad (7)$$

The variation in case that the signal pit is placed in front and the mirror surface is placed therebehind is as the following:

$$DTVp- = (TVp37-) - (TVp33-) \qquad (8)$$

Here, the values DTVp+ and DTVp- are different and have different effect for the respective cases. However, the sum of effect in both directions is constant and two times DVp of the variation shown in FIG. 6A and the formula (3).

$$2 \times DVp = (DTVp+) + (DTVp-) \qquad (9)$$

This value is constant regardless of the tilt of disk.

Likewise, the effect of the mirror surface is constant:

$$2 \times DVm = (DTVm+) + (DTVm-) \qquad (10)$$

This value is constant regardless of the tilt of disk.

Figure 13:
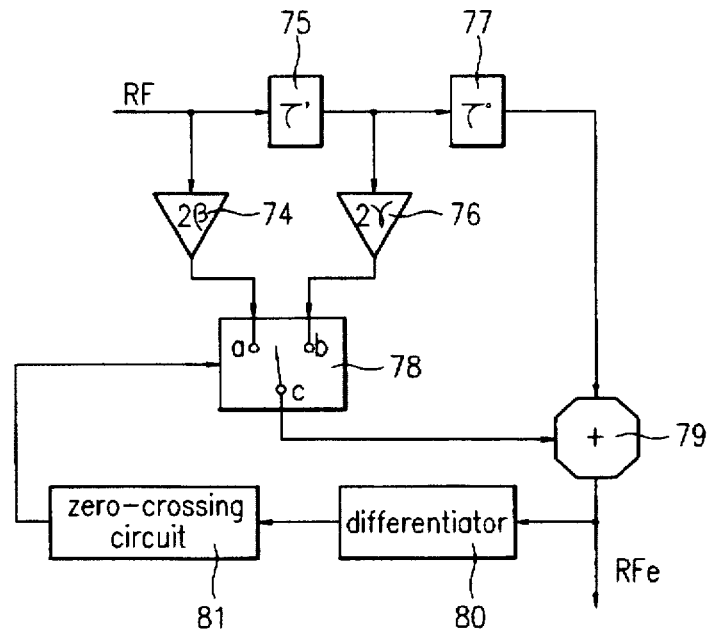
FIG. 13 is a block diagram of another embodiment of the equalizer of the present invention.

Referring to FIG. 13, another embodiment for the equalizer of the present invention comprises delays 75 and 77 for sequentially delaying the high-frequency playback signal RF output from the playback signal processing portion 3. An amplifier 74 amplifies the high-frequency playback signal RF output from the playback signal processing portion 3 to $2\beta$. Another amplifier 76 amplifies the output of delay 75 to $2\gamma$. A selector 78 selectively outputs the output of the amplifier 74 or 76 according to a selection signal from a zero-crossing circuit 81. A summer 79 sums the playback signal output from the delay 77 and the output of the selector 78 to output an equalized high-frequency playback signal RFe. A differentiator 80 differentiates the output of the summer 79, and the zero-crossing circuit 81 zero-crosses the output of the differentiator 80 to form it as a square wave and then output it as the selection signal for the selector 78.

In FIG. 13, $\tau'$ and $\tau°$ are delay times of the respective delays 75 and 77. $\tau'$ is a value obtained by dividing the difference $\Delta$ ($\Delta = Pp - Pm$) with the rotation velocity V (i.e., the playback speed of the disk):

$$\tau' = \Delta/V$$

where $\Delta$ is the difference between the pit length of the peak Pp and the distance of the mirror surface of the peak Pm, that is, the difference of the positions of the peaks Pp and Pm in FIG. 7.

$\tau°$ is obtained by dividing Pmin (the smaller value between distance Pm of the mirror surface and pit length Pp in FIG. 7), with the playback speed V:

$$\tau° = Pmin/V$$

Generally, the value Pm is smaller than value Pp. In this invention, the value Pmin is Pm.

$2\beta$ is the gain of the amplifier 74, and $2\gamma$ is the gain of the amplifier 76. Given that the variations of the curves shown in FIGS. 6A and 6B, $\beta$ and $\gamma$ are determined as the following:

$$DVp = Vp37 - Vp33,$$

$$\beta = DVp/Vp33,$$

$$DVm = Vm37 - Vm33, \text{ and}$$

$$\gamma = DVm/Vm33$$

Here, the amplifier 74 $2\beta$-time amplifies (the effect at the succeeding signal pit) the signal $\tau° + \tau'$ after the playback signal output from the delay 77. The amplifier 76 $2\gamma$-time amplifies (the effect by the succeeding mirror surface) the signal $\tau°$ after the playback signal.

The differentiator 80 differentiates the high-frequency playback signal RF or the equalized high-frequency playback signal RFe. The differentiated signal is converted into a square wave through zero-crossing by the zero-crossing circuit 81, and then output to the selector 78. Here, if the zero-crossed square wave is in HIGH state, that is, when playback is performed from the mirror surface to the signal pit, the selector 78 selects the output of the amplifier 74. If the square wave is in LOW state, that is, when playback is performed from the signal pit to the mirror surface, the selector 78 selects the output of the amplifier 76 and outputs it to the summer 79.

The summer 79 sums the playback signal output from the delay 77 and the output of the amplifier 74 or amplifier 76 via the selector 78 so that the equalized high-frequency playback signal RFe is output to the differentiator 80 and the channel bit signal reproducing portion 5 (see FIG. 1).

Figure 14:
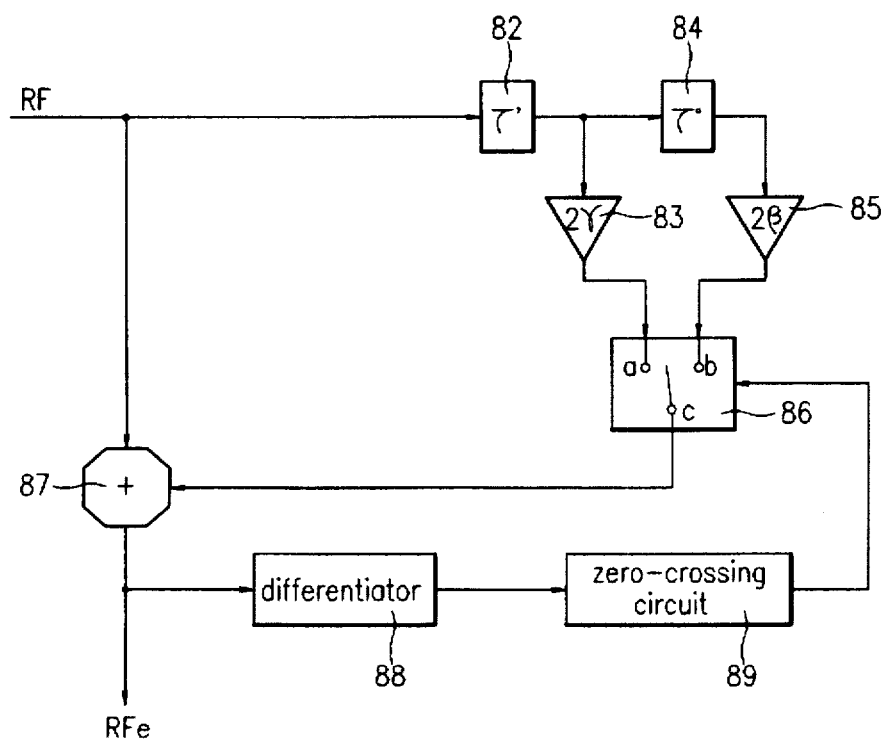
FIG. 14 is a block diagram of still another embodiment of the equalizer of the present invention.

Referring to FIG. 14, there is shown an equalizer when a tilt of disk is corrected by a signal passed by the playback signal. This equalizer of the present invention comprises delays 82 and 84 for sequentially delaying the high-frequency playback signal RF output from the playback signal processing portion 3. An amplifier 83 amplifies the output of the delay 82 to $2\gamma$, and another amplifier 85 amplifies the output of the delay 84 to $2\beta$. A selector 86 selectively outputs the output of the amplifier 83 or 85 according to a selection signal. A summer 87 sums the high-frequency playback signal RF output from the playback signal processing portion 3 and the output of the selector 86 to output an equalized high-frequency playback signal RFe. A differentiator 88 differentiates the output of the summer 87. A zero-crossing circuit 89 zero-crosses the output of the differentiator 88 to form it as a square wave and then output it as the selection signal for the selector 86.

In FIG. 14, $\tau'$ and $\tau°$ are delay times of the respective delays 82 and 84. $\tau'$ is a value obtained by dividing the difference $\Delta$ ($\Delta = Pp - Pm$) with the rotation velocity V (i.e., the playback speed of the disk):

$$\tau' = \Delta/V$$

where Δ is the difference between the pit length of the peak Pp and the distance of the mirror surface of the peak Pm, that is, the difference of the positions of the peaks Pp and Pm in FIG. 7.

τ° is obtained by dividing Pmin (the smaller value between distance Pm of the mirror surface and pit length Pp in FIG. 7), with the playback speed:

$$\tau° = Pmin/V$$

Generally, the value Pm is smaller than value Pp. In this invention, the value Pmin is Pm.

2β is the gain of amplifier 85, and 2γ is the gain of the amplifier 83. Given that the variations of the curves shown in FIGS. 6A and 6B, β and γ are determined as the following:

$$DVp = Vp37 - Vp33,$$

$$\beta = DVp/Vp33,$$

$$DVm = Vm37 - Vm33, \text{ and}$$

$$\gamma = DVm/Vm33$$

Here, the amplifier 83 2γ-time amplifies (the effect at the preceding mirror surface) the signal τ' before the high-frequency playback signal RF output from the playback signal processing portion 3 of FIG. 1. The amplifier 85 2β-time amplifies (the effect by the preceding signal pit) the signal τ°+τ' before the playback signal.

The differentiator 88 differentiates the high-frequency playback signal RF or the equalized high-frequency playback signal RFe. The differentiated signal is converted into a square wave through zero-crossing by the zero-crossing circuit 89, and then output to the selector 86. Here, if the zero-crossed square wave is in HIGH state, that is, when playback is performed from the mirror surface to the signal pit, the selector 86 selects the output of the amplifier 83. If the square wave is in LOW state, that is, when playback is performed from the signal pit to the mirror surface, the selector 86 selects the output of the amplifier 85 and outputs it to the summer 87.

The summer 87 sums the high-frequency playback signal RF from the playback signal processing portion 3 and the output of the amplifier 83 or amplifier 85 via the selector 86 so that the equalized high-frequency playback signal RFe is output to the differentiator 88 and the channel bit signal reproducing portion 5 (see FIG. 1).

In FIGS. 13 and 14, at a portion where the high-frequency playback signal RF is the maximum or minimum, a value differentiated by the differentiator approximates level 0. Therefore, the square wave converted by the zero-crossing circuit may repeat its HIGH and LOW states. However, this case does not affect the jitter, and thus involves no problem. In the embodiments of FIGS. 13 and 14, the equalization can be maintained below a predetermined level in spite of the tilt of the disk, even though perfect equalization is not achieved because the effect is considered only in one direction.

Figure 15:
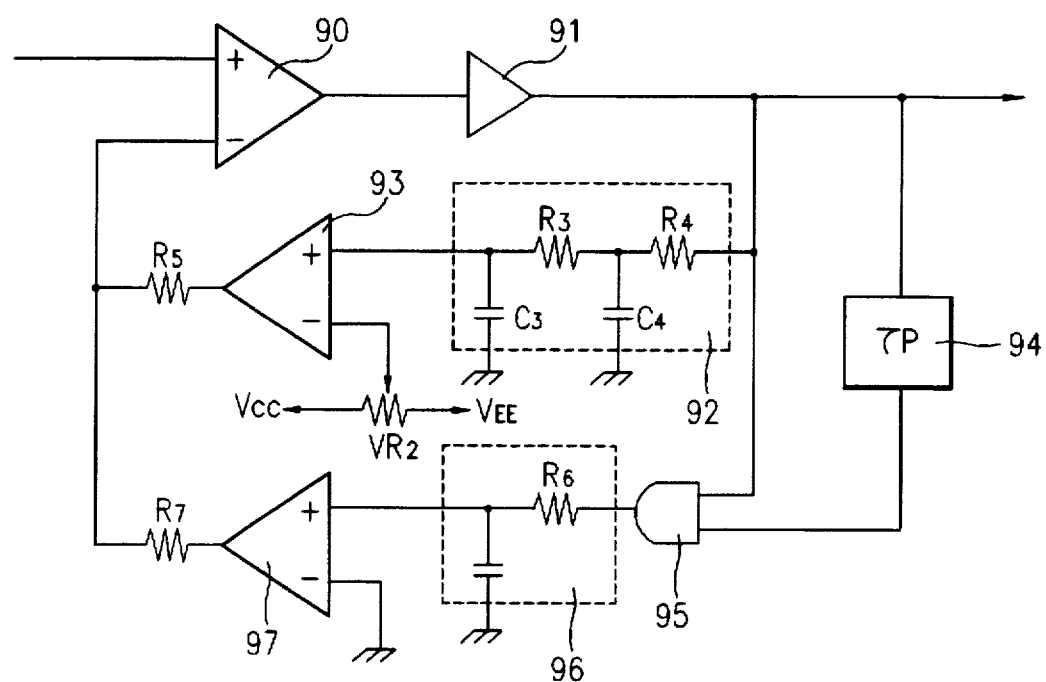
FIG. 15 is a detailed block diagram of the zero-crossing circuit of the present invention.
Figure 17:
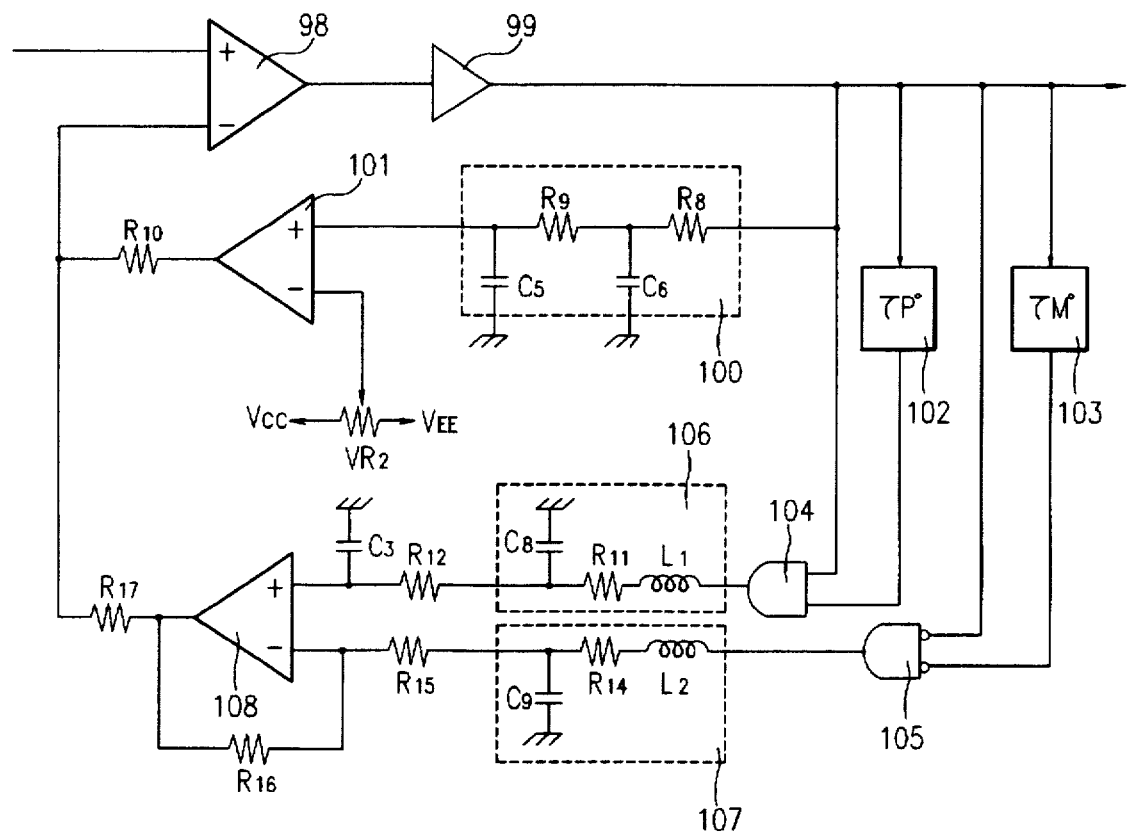
FIG. 17 is a block diagram of another embodiment of the zero-crossing circuit of the present invention.

Meanwhile, FIGS. 15 and 17 each shows a zero-crossing circuit implemented with the equalization method shown in FIG. 14. In FIG. 15, only the effect due to the signal pit having a greater effect can be controlled. The zero-crossing circuit shown in FIG. 17 is made to remove the effects due to both the mirror surface and signal pit.

Referring to FIG. 15, the zero-crossing circuit comprises a comparator 90 for receiving the high-frequency playback signal RFe output from the equalizer 4 shown in FIG. 1 as its non-inverted input (+). A buffer 91 buffers the signal output from the comparator 90 and then outputs the playback channel bit signal stream CHBr. An integrator 92 integrates the output of the buffer 91. A differential amplifier 93 receives the output of the integrator 92 as its non-inverted input (+), amplifies the difference between that and the reference voltage of its inverting input (−), and outputs a reference voltage to the inverting input terminal (−) of the comparator 90 via a resistor R5. A variable resistor VR2 is connected to the inverting input terminal (−) of the differential amplifier 93 and generates a reference voltage at the inverted input of the differential amplifier 93. A delay circuit 94 delays the output of the buffer 91 for a predetermined time τp. An AND gate 95 processes the outputs of the buffer 91 and the delay 94. An integrator 96 integrates the output of the AND gate 95. A differential amplifier 97 amplifies the difference between the output of the integrator 96 connected to its non-inverting terminal (+) and a reference voltage—$V_{EE}$ of its inverting terminal (−), and outputs a reference voltage via a resistor R7 to the inverting terminal (−) of the comparator 90 along with the output of the differential amplifier 93.

The integrator 92 comprises a resistor R4 with one terminal connected to the output terminal of the buffer 91, a capacitor C4 connected between the other terminal of resistor R4 and ground, a resistor R3 connected to the other terminal of resistor R4 and the non-inverting input terminal (+) of the differential amplifier 93, and another capacitor C3 connected between the non-inverting input terminal (+) of the differential amplifier 93 and the ground. With these components, the integrator 92 integrates the channel bit signal stream CHBr output from the buffer 91. The delay circuit 94 may be formed with a shift register operated by the channel bit clock detected from the reproduced channel bit signal stream CHBr.

The integrator 96 is made in such a manner that a resistor 96 and a capacitor C5 are connected in parallel between the output terminal of the AND gate 95 and the non-inverting input terminal (+) of the differential amplifier 97 to integrate the output of the AND gate 95.

In the zero-crossing circuit of FIG. 15, when the high-frequency playback signal RFe shown in FIG. 16A (which is corrected by the equalizer 4 of FIG. 1) is input to the non-inverting input terminal (+) of the comparator 90, the comparator 90 compares it with the reference voltage input to its inverting input terminal (−). The comparator 90 generates a square wave which goes through the buffer 91, and at the same time, the channel bit signal stream CHBr which is zero-crossed is output as shown in FIG. 16B.

The square wave of the channel bit signal stream CHBr output from the buffer 91 is integrated in the integrator 92 including resistors R3 and R4 and capacitors C3 and C4 and output as a reference voltage that is applied to the differential amplifier 93 through its non-inverting input terminal (+). The signal output from the differential amplifier 93, having a zero level according to the integrator 92 and the variable resistor VR2, is applied as the reference voltage to the comparator 90 via its inverting input terminal (−).

The output of the buffer 91 is delayed by $\tau_p$, as shown in FIG. 16C, in the delay circuit 94, and ANDed with the (non-delayed) output of the buffer 91 in the AND gate 95. The result is output as in FIG. 16D. The delay circuit 94 is preferably a shift register operated by the channel bit clock detected from the reproduced channel bit signal stream CHBr. The delay time $\tau_p$ is a multiple of the clock period and satisfies the following condition:

$$\tau_p < \tau° + \tau' \tag{11}$$

Here, τ' is a value obtained by dividing the difference Δ (Δ=Pp−Pm) by the rotation velocity V (i.e., the playback speed of the disk):

$$\tau'=\Delta/V$$

where $\Delta$ is the difference between the pit length of the peak Pp and the distance of the mirror surface of the peak Pm, that is, the difference of the positions of the peaks Pp and Pm in FIG. 7.

$\tau°$ is obtained by dividing Pmin (the smaller value between distance Pm of the mirror surface and pit length Pp in FIG. 7), by the playback speed V:

$$\tau°=Pmin/V$$

Generally, the value Pm is smaller than value Pp. In this invention, the value Pmin is Pm.

The output of the AND gate 95 shown in FIG. 16D is integrated in the integrator 96 including the resistor R6 and capacitor C5, and the output is shown as in FIG. 16E. The time constant of the integrator 96 needs only to coincide with the variation rate shown in FIG. 6A.

The differential amplifier 97 compares the output of the integrator 96 connected to its non-inverting terminal (+) with the reference voltage—$V_{EE}$ at its inverting terminal (−), and amplifies their difference and outputs to the inverting terminal (−) of the comparator 90 along with the output of the differential amplifier 93. By doing so, the zero-crossing level of the comparator 90 is controlled as shown in FIG. 16B according to the magnitude of the pit.

The output terminals of the differential amplifiers 93 and 97 are connected in parallel so that the differential amplifier 97 can vary the reference voltage input to the comparator 90 from the differential amplifier 93. For instance, the voltage charged in the capacitor C5 of the integrator 96 is input to the comparator 90 via the differential amplifier 97 so that the zero-crossing level is compensated for.

As shown in FIG. 16B, the zero-crossing circuit of FIG. 15 hardly affects the signal pit of 3T or 4T, but removes only the effect caused due to the signal pit of over 5T. Accordingly, the degree of effect varies with the length of the signal pit.

The following equation shows the relationship between the various parameters and the gain $\beta$:

$$\frac{R5}{R5+R7} \cdot \frac{Vcc}{Vp33} = 2\beta \qquad (12)$$

Here, the comparator 90 and the differential amplifiers 93 and 97 use voltages +Vcc and $-V_{EE}$, but the logic gates of the digital portion and the shift register of the delay circuit 94 use a signal power so that they operate at the ground 0V and +Vcc. The AND gate 95 operates between 0V and +Vcc.

Referring to FIG. 17, another embodiment of the zero-crossing circuit of the present invention comprises a comparator 98 for receiving the high-frequency playback signal RFe output from the equalizer 4 shown in FIG. 1 at its non-inverted input (+). A buffer 99 buffers the signal output from the comparator 98 and then outputs the playback channel bit signal stream CHBr. An integrator 100 integrates the output of the buffer 99. A differential amplifier 101 receives the output of the integrator 100 at its non-inverted input (+), amplifies the difference between it and the reference voltage of its inverting terminal (−), and outputs a reference voltage to the inverting terminal (−) of the comparator 98 via a resistor R10. A variable resistor VR3 is connected to the inverting input terminal (−) of the differential amplifier 101 and outputs a reference voltage. A delay circuit 102 delays the output of the buffer 99 for a predetermined time $\tau p°$. Another delay circuit 103 delays the output of the buffer 99 for a predetermined time $\tau m'$. An AND gate 104 processes the outputs of the buffer 99 and the delay circuit 102. Another AND gate 105 ANDs the inverted outputs of the buffer 99 and the delay circuit 103. An integrator 106 integrates the output of the AND gate 104 and another integrator 107 integrates the output of the AND gate 105. A differential amplifier 108 receives the output of the integrator 106 via its non-inverting terminal (+) and via resistor R12 and receives the output of the integrator 107 via the inverting terminal (−) and via resistor R15, compares the two incoming voltages, amplifies their difference, and outputs the difference voltage to the comparator 98 along with the output of the differential amplifier 101.

The integrator 100 comprises a resistor R8 with one terminal connected to the output terminal of the buffer 99. A capacitor C6 connected between the other terminal of the resistor R8 and the ground, a resistor R9 connected to the other terminal of resistor R8 and the non-inverting input terminal (+) of the differential amplifier 101, and another capacitor C7 connected between the non-inverting input terminal (+) of the differential amplifier 101 and the ground. With these components, the integrator 100 integrates the channel bit signal stream CHBr output from the buffer 99. The delay circuits 102 and 103 may be formed with a shift register operated by the channel bit clock detected from the reproduced channel bit signal stream CHBr.

The integrator 106 is made in such a manner that a resistor R11 and a coil L1 are serially connected between the AND gate 104 and the non-inverting terminal (+) of the differential amplifier 108, and a capacitor C8 is connected in parallel with the resistor R11. The integrator 107 has a resistor R14 and a coil L2 serially connected between the AND gate 105 and the inverting terminal (−) of the differential amplifier 108, and a capacitor C9 is connected in parallel with the resistor R14.

In the zero-crossing circuit of FIG. 17, when the high-frequency playback signal RFe is input to the non-inverting input terminal (+) of the comparator 98, the comparator 98 compares it with the reference voltage input to its inverting input terminal (−) from the parallel-connected differential amplifiers 101 and 108. The signal output from the comparator 98 is generated as a square wave via the buffer 99, and the zero-crossed channel bit signal stream CHBr is output.

The square wave of the channel bit signal stream CHBr from the buffer 99 is integrated in the integrator 100 including the resistors R8 and R9 and capacitors C6 and C7 to be output as a reference voltage to be applied to the differential amplifier 101 via its non-inverting input terminal (+). The signal output from the differential amplifier 101, whose level is zero according to the integrator 100 and the variable resistor VR3, is applied as the reference voltage to the comparator 98 via its inverting input terminal (−). Here, the reference voltage applied to the inverting input terminal (−) of the comparator 98 from the differential amplifier 101 varies with the output signal level of the differential amplifier 108.

The output of the buffer 99 is delayed by $\tau p°$ in the delay circuit 102, and delayed by $\tau m°$ in the delay circuit 103. The output of the buffer 99 is ANDed with the output of the delay circuit 102 by the AND gate 104. The inverted output of the buffer 99 and the inverted output of the delay circuit 103 are ANDed in the AND gate 105. Delay circuits 102 and 103 are each shift registers operated by the channel bit clock detected from the reproduced channel bit signal stream CHBr. Their delay circuit times $\tau p°$ and $\tau m°$ are each multiples of the clock period and satisfies the following:

$$\tau p° < \tau° + \tau' \qquad (13)$$

$$\tau m° < \tau° \qquad (14)$$

Here, τ' is a value obtained by dividing the difference Δ (Δ=Pp−Pm) with the rotation velocity V (i.e., the playback speed of the disk):

$$\tau' = \Delta/V$$

where Δ is the difference between the pit length of the peak Pp and the distance of the mirror surface of the peak Pm, that is the difference of the positions of the peaks Pp and Pm in FIG. 7.

τ° is obtained by dividing Pmin (the smaller value between distance Pm of the mirror surface and pit length Pp in FIG. 7), with the playback speed V:

$$\tau° = Pmin/V$$

Generally, the value Pm is smaller than value Pp. In this invention, the value Pmin is Pm.

Δτ is a value (L1C8) of the coil L1 or capacitor C8, which is the integration time constant of the integrator 106, or a value (L2C9) of the coil L2 or capacitor C9, which is the integration time constant of the integrator 107. Here, if the high-frequency playback signal RF is a signal reproduced by the signal pit, its polarity is positive. If the high-frequency playback signal is a signal reproduced by the mirror surface, its polarity is negative. Therefore, the AND gate 105 ANDs the inverted output of the buffer 99 and the inverted output of the delay circuit 103.

The output of the AND gate 104 is integrated in the integrator 106 including resistor R11, coil L1, and capacitor C8, and then connected to the non-inverted input (+) of the differential amplifier 108. The output of the AND gate 105 is integrated in the integrator 107 including the resistor R12, coil L2 and capacitor C9, and then connected to the inverted input (−) of the differential amplifier 108. The coils L1 and L2 of the respective integrators 106 and 107 are designed to reflect the effects shown in FIGS. 6A and 6B without change. The time constant of the integrator 106 coincides with the variation of FIG. 6A, and the time constant of the integrator 107 coincides with the variation of FIG. 6B.

The differential amplifier 108 compares the voltages from the integrators 106 and 107, and amplifies their difference to control the level of the reference voltage of differential amplifier 101 applied to the inverting terminal (−) of the comparator 98. By doing so, the zero-crossing level of the comparator 98 is controlled, and the period of the channel bit signal stream output as the square wave is corrected to remove the jitter effect.

The following equation shows the relationship between the various parameters and the gain β:

$$\frac{R10}{R10+R17} \cdot \frac{Vcc}{2} \cdot Vp33 = 2\beta \quad (15)$$

Here, the comparator 98 and the differential amplifiers 101 and 108 use voltages +Vcc and −$V_{EE}$. The logic gates of the digital portion and the shift register of the delay circuits 102 and 103, use a signal power to operate at the ground 0V and +Vcc. The outputs of the AND gates 104 and 105 are output at the levels of 0V and +Vcc.

If the polarity is changed, the comparator 98's signal input characteristic is changed so that the problem caused due to the level change is easily overcome. In other words, the high-frequency playback signal RF is connected to the inverting terminal (−) of the comparator 98, and the reference voltage applied from the differential amplifiers 101 and 108 is connected to the non-inverting terminal (+). Here, the clock period which controls the delay circuits 102 and 103 corresponds to the time of one channel bit so that the delay circuit time cannot be controlled more precisely. The delay circuit time can only be controlled more precisely if the clock frequency is multiplied.

If the delay circuit time is controlled by the clock detected from the playback signal, there is no problem in operation even though the playback velocity of the disk varies, because the reproduced clock signal is used as the digital clock signal of the shift register. The asymmetry is affected greatly by the signal pit of the disk so that an optical disk reproducing apparatus capable of reproducing various kinds of disks must use an equalizer fit for the respective disk. Especially, in case of reproducing a recordable optical disk whose signal pit corresponds to recorded marks, the asymmetry becomes more severe because the signal pit is widened. For this reason, in this case, a suitable equalizer must be used separately.

Figure 18:
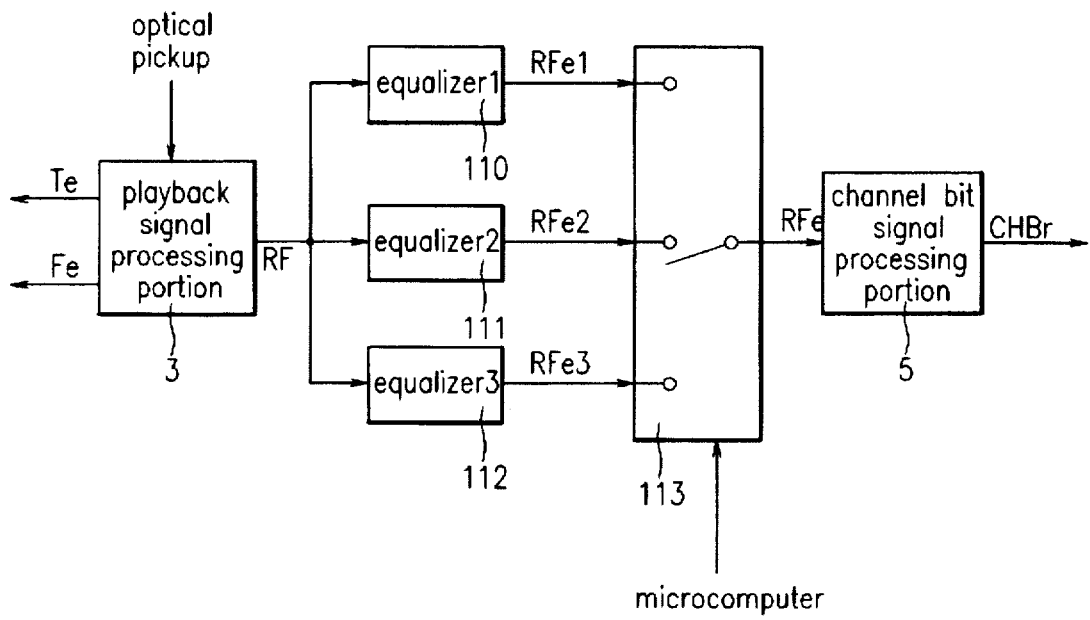
FIG. 18 is a block diagram of another embodiment of the optical disk recording/reproducing apparatus of the present invention.

FIG. 18 is a block diagram of an optical disk recording/reproducing apparatus having a plurality of equalizers provided in accordance with various types of disk. In this configuration, a plurality of equalizers 110, 111 and 112 suitable for the respective disk types are connected to the output terminal of the playback signal processing portion 3, and a selector 113 for selecting one of the equalizers 110, 111 and 112 according to the control signal output from a microcomputer (not shown) is connected to the output terminals of the equalizers 110, 111 and 112. The channel bit signal reproducing portion 5 is connected to the output terminal of the selector 113.

The equalizers 110, 111 and 112 connected to the playback signal processing portion 3 are suitable for the respective disk types such as CD, DVD or the like. If the kind of disk reproduced is detected by the microcomputer and a control signal corresponding to the detected disk is output to the selector 113, the selector 113 then selects a corresponding equalizer suitable for the detected disk according to the control signal. The equalized high-frequency playback signal RFe is output to the channel bit signal reproducing portion 5 of FIG. 1 from the selected equalizer.

Figure 19:
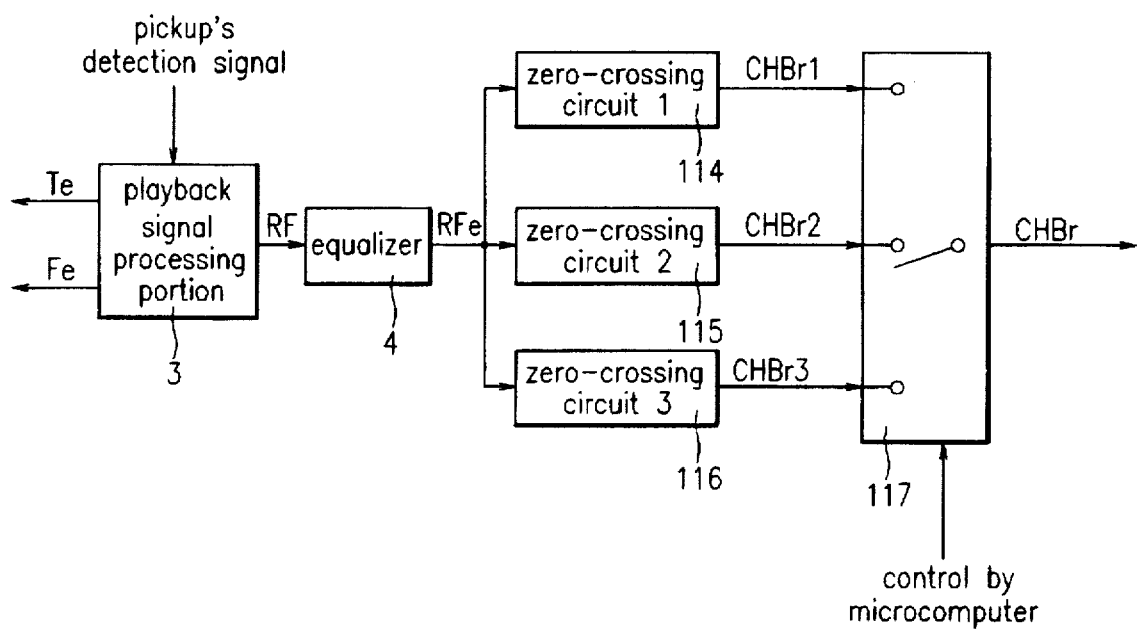
FIG. 19 is a block diagram of still another embodiment of the optical disk recording/reproducing apparatus of the present invention.

FIG. 19 is a block diagram of an optical disk recording/reproducing apparatus having a plurality of zero-crossing circuits suitable for the respective disk types in the channel bit signal reproducing portion 5. In the zero-crossing circuits, jitter time is corrected to reduce jitter.

Referring to FIG. 19, the equalizer 4 for equalizing the high-frequency playback signal RF is connected to the output terminal of the playback signal processing portion 3 and zero-crossing circuits 114, 115 and 116 suitable for the respective types of disk are connected to the output terminal of the equalizer 4. A selector 117 for selecting one of the zero-crossing circuits 114, 115 and 116 according to the control signal of the microcomputer (not shown) is connected to the output ports of the zero-crossing circuits 114, 115 and 116.

In the configuration of FIG. 19, the high-frequency playback signal RF from the playback signal processing portion 3 is distorted due to the disk's signal playback characteristic when the signal pit of disk 1 is read by the optical pickup 2. Next, a high-frequency emphasis is performed in the equalizer 4, and the equalized high-frequency playback signal RFe is output to the zero-crossing circuits 114, 115 and 116.

The zero-crossing circuits 114, 115 and 116 are suitable for the respective disk types such as CD, DVD or the like. If the kind of disk reproduced is detected by the microcomputer, a control signal corresponding to the detected disk is output to the selector 117. The selector 117 selects a corresponding zero-crossing circuit suitable for the detected disk according to the control signal, and then a channel bit signal stream that is converted to a square wave in the selected zero-crossing circuit is output through the selector 117.

With a plurality of equalizers or zero-crossing circuits in the optical disk reproducing apparatus, a high-frequency playback signal distorted due to the optical pickup's playback characteristic, which is impossible to correct by a general equalizer, can be corrected. Especially, the high asymmetries corresponding to a recordable disk such as a phase-converging optical disk (because the signal pit is widened) is improved greatly. This eliminates jitter in the reproducing apparatus and also enhances recording density.

In the optical disk recording/reproducing apparatus which is able to reproduce a playback-only disk, the equalizer or zero-crossing circuit is selectively designed so that the performance of the recording/reproducing apparatus can be improved, and particularly, the recording density of a phase-converting optical disk can be enhanced.

Accordingly, the present invention relates to an optical recording/reproducing apparatus in which, in reproducing the optical disk with an optical pickup, the sequential interference of a pit signal is asymmetric and thus the characteristic of an equalizer also becomes asymmetric so as to reduce jitter time of a channel bit signal of a zero crossing circuit generated due to the playback characteristic of the optical pickup.

The present invention has the following advantages. By making the characteristic of the equalizer asymmetric, the optical disk recording/reproducing apparatus of the present invention appropriately eliminates jitter produced by the optical pickup's asymmetric playback characteristic, resulting in enhanced playback performance. The reference voltage of the zero-crossing circuit which detects the channel bit signal is controlled by the preceding and succeeding symbols to reduce jitter time of the channel bit signal, also resulting in enhanced playback performance.

It will be apparent to those skilled in the art that various modifications and variations can be made in the optical disk recording/reproducing apparatus of the present invention without departing from the spirit or scope of the invention. Thus, it is intended that the present invention cover the modifications and variations of this invention provided they come within the scope of the appended claims and their equivalents.

What is claimed is:

1. An optical disk recording/reproducing apparatus comprising:

an optical pickup recording information onto a disk and reproducing information from the disk;

a playback signal processing unit coupled to the optical pickup and receiving electrical signals from the optical pickup, the playback signal processing unit outputting a focus control signal, a tracking control signal, and a high-frequency playback signal;

an asymmetric equalizer coupled to the playback signal processing unit and equalizing the high-frequency playback signal from the playback signal processing unit to compensate for an asymmetric playback characteristic of the optical pickup; and a channel bit signal playback unit coupled to the asymmetric equalizer and receiving the equalized high-frequency playback signal, bit signal playback unit outputting a channel bit signal string.

2. The apparatus as claimed in claim 1, wherein the asymmetric equalizer includes:

a delay unit including first, second, third, and fourth delays sequentially delaying the high-frequency playback signal from the playback signal processing unit by respective delay times $\tau'$, $\tau°$, and $\tau°$ and $\tau'$;

a first amplifier, connected to the playback signal processing unit, amplifying $\beta$-times a signal $\tau°+\tau'$ after a playback signal from the second delay and removing an effect of a succeeding signal pit;

a second amplifier, connected to an output port of the first delay, amplifying $\gamma$-times a signal $\tau°$ after the playback signal from the second delay and removing an effect of a succeeding mirror surface;

a third amplifier, connected to an output port of the third delay, amplifying $\gamma$-times a signal $\tau°$ before the playback signal from the second delay and removing an effect of a preceding mirror surface;

a fourth amplifier, connected to an output port of the fourth delay, for amplifying $\beta$-times a signal $\tau°+\tau'$ before the playback signal from the second delay and removing an effect of a preceding signal pit;

a first summer summing outputs of the first and third amplifiers;

a second summer summing outputs of the second and fourth amplifiers;

a selector selecting an output of the first or second summer by a selection signal;

a third summer summing the playback signal from the second delay and the output of the first or second summer through the selector to output the equalized high-frequency playback signal;

a differentiator differentiating the equalized high-frequency playback signal from the third summer; and a zero-crossing circuit zero-crossing an output of the differentiator to form the square wave and sending the selection signal to the selector.

3. The apparatus as claimed in claim 2, wherein the delay unit includes a divider dividing a difference $\Delta(\Delta=Pp-Pm)$ between a peak pit length (Pp) and a peak mirror surface distance (Pm), with a rotation velocity V controlled through a playback speed of the disk to produce the delay time $\tau'$ of the first and fourth delays.

4. The apparatus as claimed in claim 2, wherein the delay unit includes a divider dividing the smaller value between a peak mirror surface distance Pm and a peak pit length Pp, with a rotation velocity V controlled through a playback speed of the disk to produce the delay time $\tau°$ of the second and third delays.

5. The apparatus as claimed in claim 2, wherein gain values $\beta$ and $\gamma$ of the first, second, third, and fourth amplifiers are different.

6. The apparatus as claimed in claim 2, wherein the selector selects the output of the first summer when a playback is performed while the optical pickup passes from a mirror surface to a signal pit, and the selector selects the output of the second summer when the playback is performed while the optical pickup passes from the signal pit to the mirror surface.

7. The apparatus as claimed in claim 1, wherein the asymmetric equalizer includes:

a delay unit including first to eighth delays sequentially delaying the high-frequency playback signal from the playback signal processing unit by respective delay times $\tau'_2$, $\tau°_2$, $\tau'_1$, $\tau°_1$, $\tau°_1$, $\tau'_1$, $\tau°_2$, and $\tau'_2$;

a first amplifier, connected to the playback signal processing unit, amplifying $\beta_2$-times a signal $\tau°_1+\tau'_1+\tau°_2+\tau'_2$ after a playback signal from the fourth delay and removing an effect of a succeeding signal pit;

a second amplifier, connected to an output port of the first delay, amplifying $\gamma_2$-times a signal $\tau°_1+\tau'_1+\tau°_2$ after the playback signal from the fourth delay and removing an effect of a succeeding mirror surface;

a third amplifier, connected to an output port of the second delay, amplifying $\beta_1$-times a signal $\tau^\circ_1+\tau'_1$ after the playback signal from the fourth delay and removing the effect of a succeeding signal pit;

a fourth amplifier, connected to an output port of the third delay, amplifying $\gamma_1$-times a signal $\tau^\circ_1$ after the playback signal from the fourth delay and removing the effect of a succeeding mirror surface;

a fifth amplifier, connected to an output port of the fifth delay, amplifying $\gamma_1$-times a signal $\tau^\circ_1$ before the playback signal from the fourth delay and removing the effect of a preceding signal pit;

a sixth amplifier, connected to an output port of the sixth delay, amplifying $\beta_1$-times a signal $\tau^\circ_1+\tau'_1$ before the playback signal from the fourth delay and removing the effect of a preceding signal pit;

a seventh amplifier, connected to an output port of the seventh delay, amplifying $\gamma_2$-times a signal $\tau^\circ_1+\tau'_1+\tau^\circ_2$ from the fourth delay before the playback signal and removing the effect of a preceding mirror surface;

an eighth amplifier, connected to an output port of the eighth delay, amplifying $\beta_2$-times a signal $\tau^\circ_1+\tau'_1+\tau^\circ_2+\tau'_2$ before the playback signal from the fourth delay and removing an effect of a preceding signal pit;

a first summer summing outputs of the first, third, fifth and seventh amplifiers;

a second summer summing outputs of the second, fourth, sixth and eighth amplifiers;

a selector selecting an output of the first or second summer by a selection signal;

a third summer for summing the playback signal from the fourth delay and the output of the first or second summer through the selector to output the equalized high-frequency playback signal;

a differentiator differentiating the equalized high-frequency playback signal of the third summer; and a zero-crossing circuit zero-crossing an output of the differentiator to form the square wave and sending the selection signal to the selector.

8. The apparatus as claimed in claim 7, wherein the selector selects the output of the first summer when a playback is performed while the optical pickup passes from a mirror surface to a signal pit, and the selector selects the output of the second summer when the playback is performed while the optical pickup passes from the signal pit to the mirror surface.

9. The apparatus as claimed in claim 1, wherein the asymmetric equalizer includes:

a delay unit including first and second delays sequentially delaying the high-frequency playback signal from the playback signal processing unit by respective delay times $\tau'$ and $\tau^\circ$;

a first amplifier, connected to the playback signal processing unit, amplifying 2$\beta$-times a signal $\tau^\circ+\tau'$ after a playback signal from the second delay and removing an effect of a succeeding signal pit;

a second amplifier, connected to an output port of the first delay, amplifying 2$\gamma$-times a signal $\tau^\circ$ after the playback signal from the second delay and removing an effect of a succeeding mirror surface;

a selector selecting an output of the first or second amplifier by a selection signal;

a summer summing the playback signal from the second delay and the output of the first or second amplifier through the selector to output the equalized high-frequency playback signal;

a differentiator differentiating the equalized high-frequency playback signal of the summer; and a zero-crossing circuit zero-crossing an output of the differentiator to form the square wave and sending the selection signal to the selector.

10. The apparatus as claimed in claim 9, wherein the selector selects the output of the first amplifier when a playback is performed while the optical pickup passes from a mirror surface to a signal pit, and the selector selects the output of the second amplifier when the playback is performed while the optical pickup passes from the signal pit to the mirror surface.

11. The apparatus as claimed in claim 1, wherein the asymmetric equalizer includes:

a delay unit including first and second delays sequentially delaying the high-frequency playback signal from the playback signal processing unit by respective delay times $\tau'$ and $\tau^\circ$;

a first amplifier, connected to an output port of the first delay, amplifying 2$\gamma$-times a signal $\tau^\circ$ before the high-frequency playback signal and removing an effect of a preceding mirror surface;

a second amplifier, connected to an output port of the second delay, amplifying 2$\beta$-times a signal $\tau^\circ+\tau'$ before the high-frequency playback signal and removing an effect of a preceding signal pit;

a selector selecting an output of the first or second amplifier by a selection signal;

a summer summing the high-frequency playback signal from the playback signal processing unit and the output of the first or second amplifier through the selector to output the equalized high-frequency playback signal;

a differentiator differentiating the equalized high-frequency playback signal of the summer; and a zero-crossing circuit zero-crossing an output of the differentiator to form the square wave and sending the selection signal to the selector.

12. The apparatus as claimed in claim 11, wherein the selector selects the output of the first amplifier when a playback is performed while the optical pickup passes from a mirror surface to a signal pit, and the selector selects the output of the second amplifier when the playback is performed while the optical pickup passes from the signal pit to the mirror surface.

13. An optical disk recording/reproducing apparatus comprising:

an optical pickup recording information onto a disk and reproducing information from the disk;

a playback signal processing unit coupled to the optical pickup and receiving electrical signals from the optical pickup, the playback signal processing unit outputting a focus control signal, a tracking control signal, and a high-frequency playback signal, the high-frequency playback signal from the playback signal processing unit being distorted due to an asymmetric playback characteristic of the optical pickup;

an asymmetric equalizer coupled to the playback signal processing unit and equalizing the high-frequency playback signal from the playback signal processing unit; and a channel bit signal playback unit including a zero-crossing circuit and coupled to the asymmetric equalizer and outputting a channel bit signal string including a square wave.

14. The apparatus as claimed in claim 13, wherein the zero-crossing circuit of the channel bit signal reproducing unit comprises:
- a comparator comparing the equalized high-frequency playback signal from the equalizer with a first reference signal to output the channel bit signal string;
- a first integrator coupled to the comparator and integrating the channel bit signal string from the comparator;
- a first differential amplifier coupled to the first integrator and amplifying a difference between an output signal of the first integrator and a second reference signal, the first differential amplifier outputting a third reference signal to the comparator;
- a resistor coupled to the first differential amplifier and providing the second reference signal to the first differential amplifier;
- a delay unit delaying the channel bit signal string of the comparator by a delay time τp;
- a logic gate unit coupled to the delay unit and receiving the channel bit signal string of the comparator and an output of the delay unit and producing a logical AND result;
- a second integrator coupled to the logic gate unit and integrating the result of the logic gate unit; and
- a second differential amplifier coupled to the second integrator, and amplifying a difference between an output signal of the second integrator and a fourth reference signal to control a level of the third reference signal from the first differential amplifier.

15. The apparatus as claimed in claim 14, wherein the delay unit includes a shift register operated by a channel bit clock detected from the channel bit signal string.

16. The apparatus as claimed in claim 14, wherein the delay time τp of the delay unit is a multiple of a clock period (τp<τ°+τ'), where delay time τ' is obtained by dividing a difference Δ(Δ=Pp−Pm) between a peak pit length (Pp) and a peak mirror surface distance (Pm) with a rotation velocity V decided by a playback speed of the disk, and the delay time τ° is obtained by dividing the smaller value between the peak mirror surface distance Pm and the peak pit length Pp with the rotation velocity V of the disk.

17. The apparatus as claimed in claim 13, wherein the zero-crossing circuit of the channel bit signal reproducing unit comprises:
- a comparator comparing the equalized high-frequency playback signal from the equalizer with a first reference signal to output the channel bit signal string;
- a first integrator coupled to the comparator and integrating the channel bit signal string from the comparator;
- a first differential amplifier coupled to the first integrator and amplifying a difference between an output signal of the first integrator and a second reference voltage, the first differential amplifier outputting a third reference signal to the comparator;
- a resistor coupled to the first differential amplifier and providing the second reference voltage to the first differential amplifier;
- a first delay unit delaying the channel bit signal string of the comparator by a delay time τp°;
- a first logic gate unit coupled to the first delay unit and receiving the channel bit signal string of the comparator and an output of the first delay unit and producing a logic AND result;
- a second integrator coupled to the first logic gate unit and integrating an output of the first logic gate unit;
- a second delay unit delaying the channel bit signal string of the comparator by a delay time τm°;
- a second logic gate unit coupled to the second delay unit and receiving an inverted channel bit signal string of the comparator and an inverted output of the second delay unit and producing a logical AND result;
- a third integrator coupled to the second logic gate unit and integrating the result of the second logic gate unit; and
- a second differential amplifier coupled to the third integrator and amplifying a difference between an output signal of the second integrator and an output signal of the third integrator to control a level of the third reference signal from the first differential amplifier to the comparator.

18. The apparatus as claimed in claim 17, wherein the first delay unit is a shift register operated by a channel bit clock detected from the channel bit signal string.

19. The apparatus as claimed in claim 17, wherein the second delay unit is a shift register operated by a channel bit clock detected from the channel bit signal string.

20. The apparatus as claimed in claim 17, wherein the delay time τp° of the first delay unit is a multiple of a clock period (τp°<τ°+τ'), where the delay time τ' is obtained by dividing a difference Δ(Δ=Pp−Pm) between a peak pit length (Pp) and a peak mirror surface distance (Pm), with a rotation velocity V decided by a playback speed of the disk, and the delay time τ° is obtained by dividing the smaller value between the peak mirror surface distance Pm and the peak pit length Pp, with the rotation velocity V of the disk.

21. The apparatus as claimed in claim 17, wherein the delay time τm° of the second delay unit is a multiple of a clock period (τm°<τ°), and the delay time τ° is obtained by dividing the smaller value between a peak mirror surface distance Pm and a peak pit length Pp, with a rotation velocity V of the disk.

22. An optical disk recording/reproducing apparatus for reproducing an optical disk where information signals are recorded in serial pits on spiral signal tracks, the apparatus comprising:
- an optical pickup recording information onto a disk and reproducing information from the disk;
- a playback signal processing unit coupled to the optical pickup and receiving electrical signals from the optical pickup, the playback signal processing unit outputting a focus control signal, a tracking control signal, and a high-frequency playback signal;
- an equalizing unit coupled to the playback signal processing unit and having a plurality of equalizers suitable for respective disk types, the equalizing unit equalizing the high-frequency playback signal from the playback signal processing unit;
- a control unit coupled to the equalizing unit and detecting a disk type of the disk reproduced and outputting a control signal corresponding to the disk type;
- a selection unit selecting an equalizer corresponding to the detected disk type and outputting an equalized high-frequency playback signal equalized in the selected equalizer according to the control signal of the control unit; and
- a channel bit signal playback unit zero-crossing the equalized high-frequency playback signal from the selection unit to detect a channel bit signal string of a square wave.

23. The apparatus as claimed in claim 22, wherein the plurality of equalizers are asymmetric.

24. An optical disk recording/reproducing apparatus for reproducing an optical disk where information signals are recorded, the apparatus comprising:

- an optical pickup recording information onto a disk and reproducing information from the disk;
- a playback signal processing unit coupled to the optical pickup and receiving electrical signals from the optical pickup, the playback signal processing unit outputting a focus control signal, a tracking control signal, and a high-frequency playback signal;
- an asymmetric equalizer coupled to the playback signal processing unit and equalizing the high-frequency playback signal from the playback signal processing unit, the high-frequency playback signal being distorted due to an asymmetric playback characteristic of the optical pickup;
- a channel bit signal playback unit having a plurality of zero-crossing circuits suitable for respective disk types and for zero-crossing the equalized high-frequency playback signal from the asymmetric equalizer via a selected zero-crossing circuit to detect a channel bit signal string of a square wave;
- a control unit for detecting the disk type of the disk reproduced and outputting a control signal corresponding to the disk type; and
- a selection unit for selecting a zero-crossing circuit corresponding to the detected disk type and outputting a channel signal bit signal string detected by the selected zero-crossing circuit under the control signal of the control unit.

25. The apparatus as claimed in claim 24, wherein the zero-crossing circuits are asymmetric.

* * * * *